United States Patent
Sawada et al.

(10) Patent No.: US 7,853,357 B2
(45) Date of Patent: Dec. 14, 2010

(54) ROBOT BEHAVIOR CONTROL BASED ON CURRENT AND PREDICTIVE INTERNAL, EXTERNAL CONDITION AND STATES WITH LEVELS OF ACTIVATIONS

(75) Inventors: Tsutomu Sawada, Tokyo (JP);
Masahiro Fujita, Saitama (JP);
Tsuyoshi Takagi, Saitama (JP)

(73) Assignee: Sony Corporation, Tokyo (JP)

( * ) Notice: Subject to any disclaimer, the term of this patent is extended or adjusted under 35 U.S.C. 154(b) by 1153 days.

(21) Appl. No.: 10/547,922

(22) PCT Filed: Mar. 9, 2004

(86) PCT No.: PCT/JP2004/003030

§ 371 (c)(1),
(2), (4) Date: Sep. 8, 2005

(87) PCT Pub. No.: WO2004/080665

PCT Pub. Date: Sep. 23, 2004

(65) Prior Publication Data

US 2006/0184273 A1    Aug. 17, 2006

(30) Foreign Application Priority Data

Mar. 11, 2003    (JP)    ............................ P 2003-065587

(51) Int. Cl.
*G05B 13/02*    (2006.01)
(52) U.S. Cl. ........................... 700/250; 700/30; 700/31; 706/14; 706/15; 706/21; 706/23; 318/567; 318/568.1; 318/568.12

(58) Field of Classification Search ............. 700/29–31, 700/245, 250; 706/14, 15, 21, 23; 318/567, 318/568.1, 568.12
See application file for complete search history.

(56) References Cited

U.S. PATENT DOCUMENTS

| 6,175,772 | B1 * | 1/2001 | Kamiya et al. ................. 700/31 |
| 6,295,602 | B1 * | 9/2001 | Weissman et al. .............. 713/1 |
| 6,347,261 | B1 * | 2/2002 | Sakaue et al. ............... 700/245 |

(Continued)

FOREIGN PATENT DOCUMENTS

JP    62-24988    2/1987

(Continued)

*Primary Examiner*—Thomas G Black
*Assistant Examiner*—Sze-Hon Kong
(74) *Attorney, Agent, or Firm*—Frommer Lawrence & Haug LLP; William S. Frommer; Ellen Marcie Emas

(57) ABSTRACT

In a robot device, an action selecting/control system includes a plurality of elementary action modules each of which outputs an action when selected. An activation level calculation unit calculates an activation level AL of each elementary action on the basis of information from an internal-state manager and external-stimulus recognition unit and with reference to a data base. An action selector selects an elementary action whose activation level AL is highest as an action to be implemented. Each action is associated with a predetermined internal state and external stimulus. The activation level calculation unit calculates an activation level AL of each action on the basis of a predicted satisfaction level variation based on the level of an instinct for an action corresponding to an input internal state and a predicted internal-state variation predictable based on an input external stimulus.

11 Claims, 28 Drawing Sheets

U.S. PATENT DOCUMENTS

| | | | | |
|---|---|---|---|---|
| 6,359,622 | B1* | 3/2002 | Hayes-Roth | 345/474 |
| 6,446,056 | B1* | 9/2002 | Sadakuni | 706/14 |
| 6,490,501 | B1* | 12/2002 | Saunders | 700/198 |
| 6,490,570 | B1* | 12/2002 | Numaoka | 706/14 |
| 6,529,887 | B1* | 3/2003 | Doya et al. | 706/12 |
| 6,587,846 | B1* | 7/2003 | LaMuth | 706/21 |
| 6,682,390 | B2* | 1/2004 | Saito | 446/268 |
| 6,690,134 | B1* | 2/2004 | Jones et al. | 318/567 |
| 6,708,081 | B2* | 3/2004 | Yoshida | 700/245 |
| 6,845,297 | B2* | 1/2005 | Allard | 700/259 |
| 6,941,199 | B1* | 9/2005 | Bottomley et al. | 701/23 |
| 7,303,010 | B2* | 12/2007 | de Guzman et al. | 166/255.1 |
| 7,333,969 | B2* | 2/2008 | Lee et al. | 706/52 |
| 7,567,052 | B2* | 7/2009 | Jones et al. | 318/587 |
| 7,599,896 | B2* | 10/2009 | Peters, II | 706/14 |
| 2001/0047226 | A1* | 11/2001 | Saijo et al. | 700/261 |
| 2002/0024312 | A1* | 2/2002 | Takagi | 318/568.12 |
| 2002/0098879 | A1* | 7/2002 | Rheey | 463/1 |
| 2003/0069863 | A1* | 4/2003 | Sadakuni | 706/11 |
| 2003/0074337 | A1* | 4/2003 | Sadakuni | 706/11 |
| 2004/0002790 | A1* | 1/2004 | Senn | 700/246 |
| 2004/0054638 | A1* | 3/2004 | Agami et al. | 706/46 |
| 2007/0073631 | A1* | 3/2007 | Hinchey et al. | 706/14 |
| 2007/0213892 | A1* | 9/2007 | Jones et al. | 701/23 |

FOREIGN PATENT DOCUMENTS

| | | |
|---|---|---|
| JP | 2000-42959 | 2/2000 |
| JP | 2001-38658 | 2/2001 |
| JP | 2001-328091 | 11/2001 |
| JP | 2001-334482 | 12/2001 |
| JP | 2002-219677 | 8/2002 |

* cited by examiner

ROBOT BEHAVIOR CONTROL BASED ON CURRENT AND PREDICTIVE INTERNAL, EXTERNAL CONDITION AND STATES WITH LEVELS OF ACTIVATIONS

TECHNICAL FIELD

The present invention generally relates to a robot device that can autonomously act and a method and program of controlling the action of the robot device, and more particularly to a robot device that can select and implement an action on the basis of its own internal state and an external stimulus and a robot action controlling method and program.

This application claims the priority of the Japanese Patent Application No. 2003-065587 filed on Mar. 11, 2003, the entirety of which is incorporated by reference herein.

BACKGROUND ART

Recently, new robotic fields including coexistent robots and entertainment robots are under study and development in place of the industrial robot devices. Such robots are designed to implement an action on the basis of information such as external stimuli from sensors or the like.

For example, a method of creating a robot action on the basis of an evaluation done from the viewpoint of robot's self-preservation is disclosed in "Tetsuya Ogata and Shigeki Kanno: Creation of Robot Action On the Basis of Self-preservation—Methodology and Implementation of Machine Model, Journal of the Japan Academy of Robotics (1997), Vol. 15, No. 5, pp. 710-721 (will be referred to as "conventional art" hereunder). The "evaluation from the viewpoint of robot's self-preservation" is to evaluate a robot device from the viewpoints of durability and failure rate of the robot hardware. More specifically, a self-preservation evaluation function is calculated which is to convert environment information (inputs from visual and auditory sensors) as well as input information including state of the battery, power consumption, circuit temperature, etc. into an evaluation value (failure rate) of the robot device's durability from the standpoints of the hardware durability and failure rate, and the values of internal and external sensory information and self-preservation function are monitored to shift an action, being done, of a plurality of behaviors with a command for another action being actually given to the robot device. Thus, the robot device will reflect such acceptability that it will implement an action for a better evaluation of the self-preservation, not any action for a worse evaluation.

Also, the robot device can have introduced therein a self-preservation evaluation function for modeling "Sentiment". It can express an emotion by appearing in yellow to show a joy when it is charged and in blue to show a fear when it is discharged, for example.

The evaluation, based on the "Self-preservation", of the robot device disclosed in the conventional art is so simple that the "Charging" is evaluated to be good while "Discharging" is evaluated to be not good. That is, the evaluation can only lead to a one-way communication with the human being.

Many of the coexistent and entertainment robots, generally taken as toys, are designed to act only in response to external stimuli. That is, the relation between a user's operation and robot's response is a fixed one. Accordingly, the robot users get tired of such toy robots which repeat only the same action in response to the same external stimulus.

There have recently been proposed robot systems in which the emotions such as instinct and sentiment are modeled to manage the internal state of the system and an action is selected correspondingly to a variation of the internal state. In many of such robot systems, however, actions selectable in response to an internal state and external stimulus are fixed ones and it is difficult to select any action other than such fixed actions via an interaction between the user and environment.

If a function to have a robot implement a next optimum action or motion suitable for the current situation and a function to have the robot change a next action or motion on the basis of its past experiences can be installed in the robot, the robot will be able to have the user feel an increased affinity or satisfaction with the robot. This robot will give a larger amusement to the user, and its interaction with the user will be smoother.

DISCLOSURE OF THE INVENTION

Accordingly, the present invention has an object to overcome the above-mentioned drawbacks of the related art by providing a robot device that can implement unwearying actions as an entertainment robot, and a robot action controlling method and program.

The above object can be attained by providing a robot device which autonomously selects and implements an action on the basis of its own internal state and an external stimulus, the robot device including according to the present invention:

a plurality of action-stating modules each having an action stated therein;

an activation level calculating means for calculating the activation level of each of the actions stated in the plurality of action-stating modules from the internal state and external stimulus; and an action selecting means for selecting one of the action-stating modules on the basis of the calculated activation level and making the action stated in the selected action-stating module, the action stated in each of the action-stating modules being associated with a predetermined internal state and external stimulus; and the activation level calculating means determining an instinct level for an action associated with the internal state and a satisfaction level based on the internal state, and calculating the activation level for each action on the basis of an instinct level determined from a current internal state and a variation of a predicted satisfaction level determined from an internal state which, it is predicted based on the current internal state and input external stimulus, will vary.

In the above robot device according to the present invention, since the instinct level of the action corresponding to the current internal state is determined, a variation of the predicted satisfaction level, which is a difference between the level of satisfaction with the current internal state and the predicted satisfaction level corresponding to the predicted internal state which, it is predicted, will vary after the external stimulus is supplied and the action is made, the activation level is calculated from the satisfaction level and predicted satisfaction level variation and an action to be made is selected based on the calculated activation level, the robot device can implement various unique actions in response to the internal state which will vary correspondingly to its surrounding and communication with the user, and various external stimulus.

Also, the activation level calculating means may be adapted to calculate the activation level of each action from the instinct level determined from the current internal state, satisfaction level determined from the current internal state and the predicted satisfaction level variation.

Further, the activation level calculating means may have an activation level calculation data base in which input external stimulus and predicted internal-state variation calculates the activation level with reference to the activation level calculation data base. Different data bases may be prepared correspondingly to the users with whose the robot device communicates and the surroundings of the robot device.

Moreover, the activation level calculation data base may have the predicted internal-state variation associated with the external stimulus. Thus the activation level calculation data base makes it possible to calculate a predicted interval-state variation by making linear interpolation of an input value not found in the activation level calculation data base by means of a linear model. Since the activation level calculation data base needs not have predicted internal-state variations for all values each external stimulus has, it is possible to reduce the amount of data.

Also, the above object can be attained by providing a robot action controlling method for use in a robot device to control the robot device to autonomously select and implement an action on the basis of its own internal state and an external stimulus, the method including, according to the present invention:

an activation level calculating step of calculating the activation level of each of the actions stated in a plurality of action-stating modules from the internal state and external stimulus; and an action selecting step of selecting one of the action-stating modules on the basis of the calculated activation level and making the action stated in the selected action-stating module, the action stated in each of the action-stating modules being associated with a predetermined internal state and external stimulus; and in the activation level calculating step, an instinct level for an action associated with the internal state and a satisfaction level being determined based on the internal state, and the activation level for each action being calculated from an instinct level determined from a current internal state and a variation of a predicted satisfaction level determined from an internal state which, it is predicted based on the current internal state and input external stimulus, will vary.

Also the above object can be attained by providing a robot action controlling program readable by a computer to have the computer control a robot device to autonomously select and implement an action on the basis of its own internal state and an external stimulus.

BEST MODE FOR CARRYING OUT THE INVENTION

The present invention will be described in detail concerning the embodiments thereof with reference to the accompanying drawings. The present invention is applied to a robot device that mimics a life and can make an interaction with the user, such as a pet type agent, humanoid type agent or the like. The configuration of such a robot device will first be described below. Next, of a control system in the robot device, an action-selection control system for selecting an action will be described. Finally, a robot control system including such an action-selection control system will be described.

(A) Configuration of the Robot Device

Figure 1:
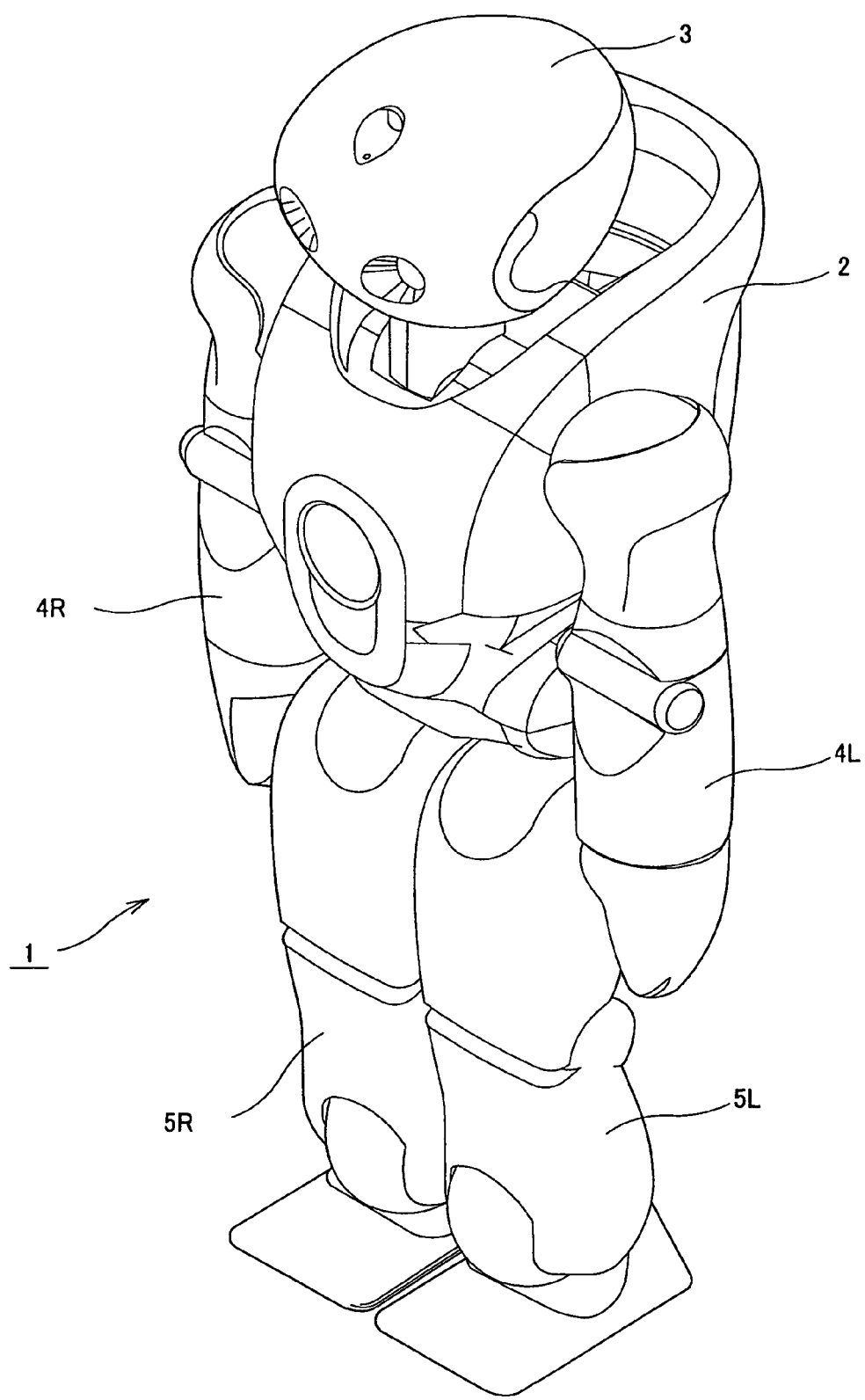
FIG. 1 is a perspective view showing the appearance of the robot device as an embodiment of the present invention.

FIG. 1 is a perspective view showing the appearance of the robot device as an embodiment of the present invention. As shown in FIG. 1, the robot device, generally indicated with a reference numeral 1, is an assembly of a body unit 2, head unit 3 coupled to two predetermined positions of the body unit 3, two arm units, right and left, 4R and 4L and two leg units, right and left, 5R and 5L. The arm units 4R and 4L and leg units 5R and 5L are coupled to the body unit 2 as shown. It should be noted here that "R" and "L" stand for "right" and "left", respectively, and this is also true in the following description.

Figure 2:
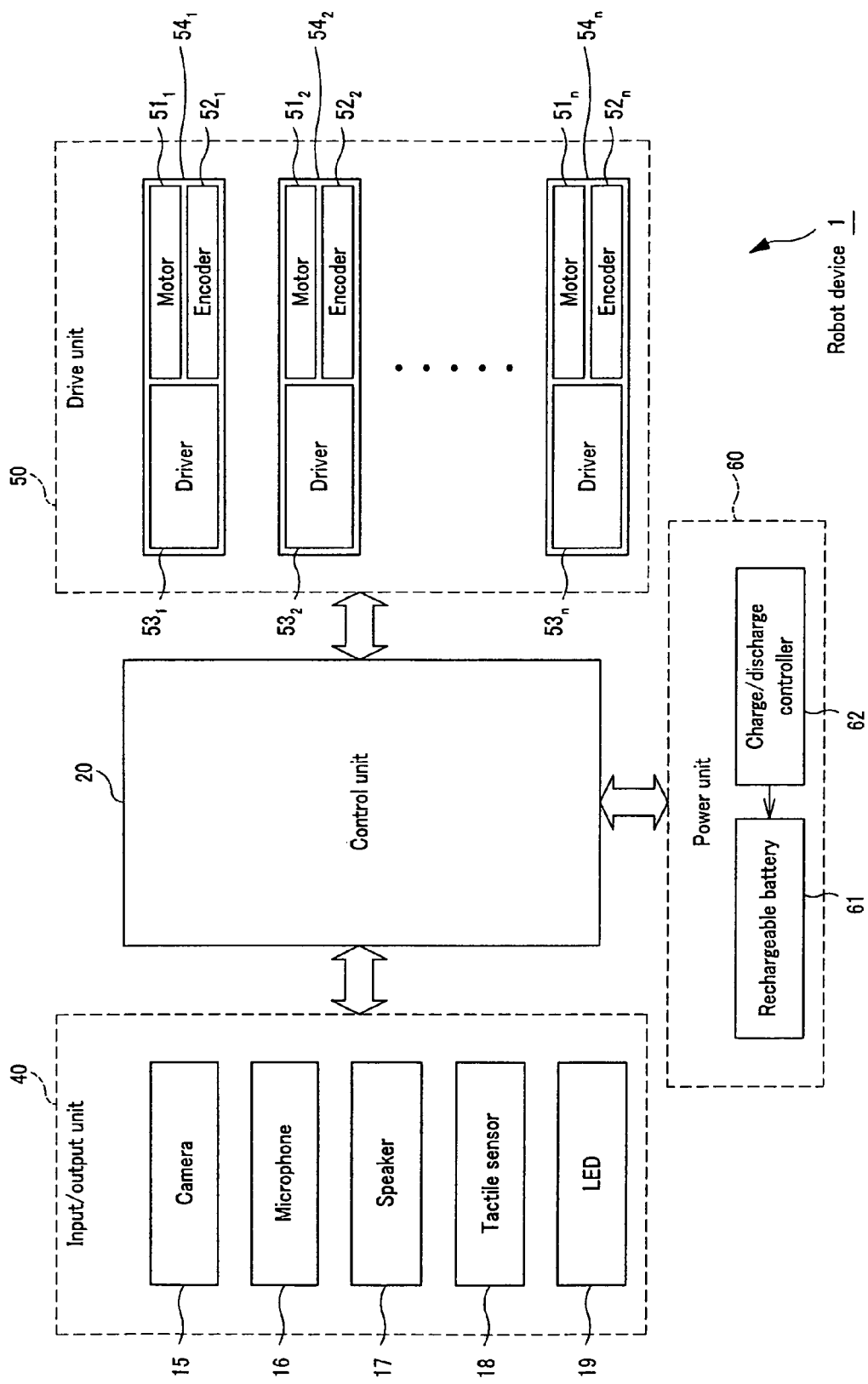
FIG. 2 is a schematic block diagram of the robot device as the embodiment of the present invention.

FIG. 2 is a schematic functional-block diagram of the robot device as the embodiment of the present invention. As shown in FIG. 2, the robot device 1 includes a control unit 20 which makes operation control of the entire robot device 1 and processes data, input/output unit 40, drive unit 50 and a power unit 60. Each of these components will be described below.

The input/output unit 40 includes input elements such as a CCD camera 15 which is equivalent to the human eyes and captures the image of surroundings, a microphone 16 which is equivalent to the human ears, tactile sensors 18 disposed at the head unit, back, etc. to sense a touch by the user by electrically detecting a predetermined pressure applied to such a body portion, a distance sensor to measure a distance to an object lying ahead of the robot device, and gyro sensors and various other sensors equivalent to the five senses of the human being. Also, the input/output unit 40 includes output elements such as a speaker 17 provided in the head unit 3 and which is equivalent to the human mouth, LED indicators (eye lamp) 19 provided in the positions of the human eyes to express an emotion and shows a visually recognized state, etc. Providing voices, flickering of the LED indicators 19, etc., the output elements can also express a user feedback from the robot device 1 by any other than a mechanical movement pattern of the legs, etc.

For example, by detecting a touch by a combination of tactile sensors 18 provided on the top of the head unit, it is possible to detect a user's action on the head of the robot device 1, such as "Patting", "Hitting", "Tapping" or the like. For example, a series of touches detected by some of pressure sensors sequentially at predetermined times intervals may be regarded as "Patting", while a touch detected by the pressure sensor in a short time be regarded as "Hitting", the internal state be varied correspondingly to the determination, and the variation of the internal state be expressed by the aforementioned output elements.

The drive unit 50 is a functional block to implement a body motion of the robot device 1 according to a command for a predetermined pattern of movement, supplied from the control unit 20. It is controlled by the control unit 20 for controlling the action of the robot device 1. Also, the drive unit 50 is a functional module to implement the degrees of freedom of each of the joints of the robot device 1, and includes a plurality of drive units $54_1$ to $54_n$ provided on each of the roll, pitch and yaw axes of each of the joints. Each of the drive units includes a combination of a motor to make rotation about a predetermined axis, encoder to detect a rotational position of the motor, and a driver to adaptively control the rotational position and rotating speed of the motor on the basis of output from the encoder. More specifically, the drive unit $54_1$ includes a motor $51_1$, encoder $52_1$ and driver $53_1$, the driver unit $54_2$ includes a motor $51_2$, encoder $52_2$ and driver $53_2$, ..., and the drive unit $54_n$ includes a motor $51_n$, encoder $52_n$ and driver $53_n$.

The robot device 1 according to the present invention is of a bipedal walking type, but by varying the combination of the drive units, it may be built as a legged locomotion robot such as a quadrupedal walking robot or the like.

The power unit 60 is literally a functional module to supply a power to each of the electric circuits and the like inside the robot device 1. The robot device 1 as the embodiment of the present invention is a self-driven type using a battery. The power unit 60 includes a rechargeable battery 61, and a charge/discharge controller 62 to manage the charged/discharged condition of the rechargeable battery 61.

The rechargeable battery 61 is for example a "battery pack" formed from a plurality of lithium-ion secondary cells packaged in a cartridge.

Also, the charge/discharge controller 62 detects the residual potential in the battery 61 by measuring the terminal voltage and charging/discharge current amount of the battery 61, ambient temperature around the battery 61, etc. to determine a start timing and end timing of battery charging, etc. The control unit 20 is informed of start timing and end timing of battery charging, determined by the charge/discharge controller 62, to control the robot device 1 to start and end the battery charging operation.

The control unit 20 is equivalent to the "brain", and installed in the head or body unit of the robot device 1, for example.

Figure 3:
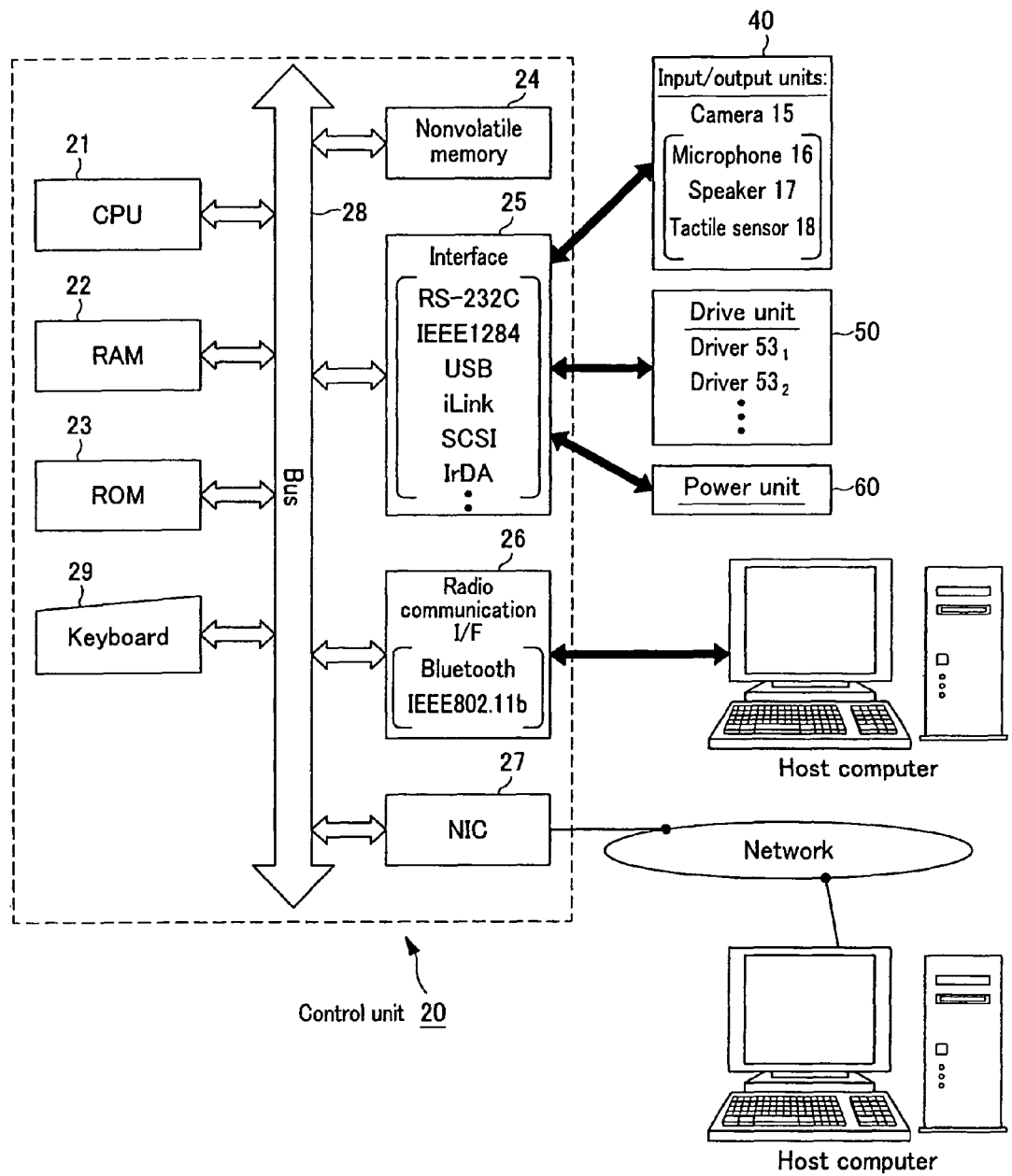
FIG. 3 is a detailed block diagram of a control unit included in the robot device as the embodiment of the present invention.

FIG. 3 is a detailed block diagram of the control unit. As shown in FIG. 3, the control unit 20 includes a CPU (central processing unit) 21 as a main controller connected to memories, other circuit components and peripheral devices by a bus 28. The bus 28 is a common signal transmission channel including a data bus, address bus, control bus, etc. Each of the devices on the bus 28 is assigned a unique address (memory address or I/O address). The CPU 21 can communicate with a specific device on the bus 28 by designating the address of the device.

As one of the devices on the bus 28, there is provided a RAM (random-access memory) 22 which is a writable memory formed from a volatile memory such as a DRAM (dynamic RAM). It is used to load a code for a program which is to be executed by the CPU 21, and provisionally save work data based on a program to be executed.

As one of the devices on the bus 28, there is also provided a ROM (read-only memory) 23 which is a read-only memory to permanently store a program and data. Program codes stored in the ROM 23 include a self-test program to be executed first after the power is supplied to the robot device 1, an operation control program to specify the operation of the robot device 1, etc.

The control program for the robot device 1 includes a "sensor input/recognition program" for processing a sensor input from the camera 15, microphone 16 or the like and recognizing it as a symbol, an "action control program" for controlling the action of the robot device 1 on the basis of the sensor input and predetermined action control model while governing the storing operation such as short-term storage, long-term storage, etc. (will be described in detail later), a "drive control program" for controlling the driving of each joint motor, voice output from the speaker 17, etc. according to the action control model, etc.

As one of the devices on the bus 28, there is also provided a nonvolatile memory 24 formed from an electrically erasable and rewritable memory element such as EEPROM (electrically erasable and programmable ROM). It is used to hold data to be updated consecutively in a nonvolatile manner. The data to be updated consecutively includes security information such as encrypt key and others, a device control program to be installed after shipment, etc.

As one of the devices on the bus 28, there is also provided an interface 25 which interconnects the robot device 1 and devices provided outside the control unit 20 with each other to enable the robot device 1 to exchange data with such external devices. The interface 25 supplies and receives data to and from the camera 15, microphone 16 or speaker 17. Also, the interface 25 supplies and receives data and command to and from the drivers $53_1$ to $53_n$ in the drive unit 50.

Further, the interface 25 may include general-purpose interfaces for connecting peripheral devices for a computer, such as a serial interface like RS (Recommended Standard)-232C, parallel interface like IEEE (Institute of Electrical and Electronics Engineers) 1284, USB (universal serial bus) interface, i-Link (IEEE 1394) interface, SCSI (small computer system interface), memory card interface which accepts an RC card or memory stick, or the like to move a program or data between locally connected external devices.

The above interface 25 may also include an infrared data communication (IrDA) interface to make radio communications with the external devices.

Further, the control unit 20 includes a radio communication interface 26, network interface card (NIC) 27 and the like to proximity radio data communications such as Bluetooth or data communication with various host computers via a radio network such as IEEE 802.11b or wide-area network such as the Internet.

By making data communications between the robot device 1 and a host computer, it is possible to make a computation for a complicated operation control of the robot device 1 or a remote control of the robot device 1 with the use of a remote computer resource.

(B) Action Control of the Robot Device

Next, the method of controlling the action of the robot device as the embodiment of the present invention will be described in detail. The aforementioned robot device 1 is designed to autonomously act in response to its own internal state and external state, or an instruction or action from the user. That is, the robot device 1 can autonomously select and implement an action in response to an external stimulus and its own internal state. By the method of controlling the action of the robot device according to the present invention, another action is selected and performed based on an activation level AL of the action. Of the action control of the robot device, the action-selection control procedure ranging from selection of an action to be made in response to an internal state of the robot device and an external stimulus to making the selected action will be described herebelow. How to calculate an activation level AL as a reference for selection of an action of the robot device will be explained first.

(1) Selection of an Action of the Robot Device

Figure 4:
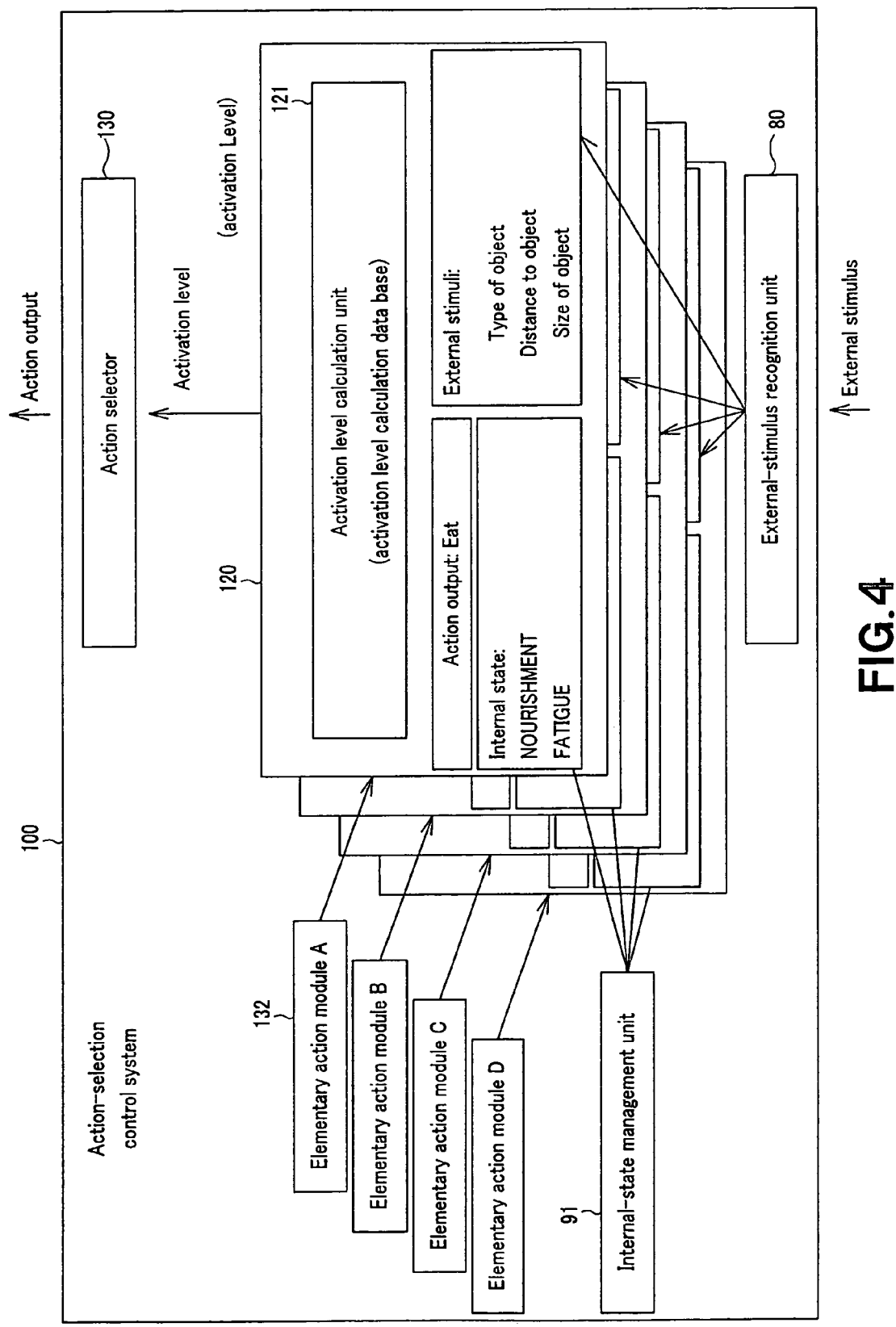
FIG. 4 is a schematic diagram of an action selection system part included in a control system in the robot device as the embodiment of the present invention to calculate an activation level of each action and have the robot device implement an action from the calculated activation level.

FIG. 4 is a schematic diagram of an action selection system part included in a control system in the robot device to calculate an activation level of each action and implement an action from the calculated activation level. As shown in FIG. 4, the action-selection control system, indicated with a reference numeral 100, includes an internal-state manager (ISM) 91 to manage some kinds of emotion such as instinct and sentiment by making them into a mathematical model, an external-stimulus recognition unit 80 to recognize an external stimulus such as a sensor input or the like in the surroundings, a plurality of elementary action modules 132 (only A to D are shown in FIG. 4) each outputting an action selected on the basis of the internal state and external stimulus, an activation level calculation unit 120 to calculate an activation level AL of each elementary action module 132, and an action selector 130 to select, based on the activation level AL, an elementary action module 132 to be made. When the selected elementary action module 132 provides an output action, the robot device 1 implements the action.

The elementary action module 132 is a module to determine an action output from an internal state and external stimulus. A state machine is prepared for each module, and the results of recognition of external information supplied from the sensors are sorted depending upon the preceding actions (motions) and situations to make the robot device implement the action. The module (action-stating module) is stated as a schema 121 having a Monitor function to appreciate the situation correspondingly to the external stimulus and internal state and calculate an activation level AL, and an Action function to implement a state machine incidental to the action implementation. The schema will be described in detail later. For each elementary action module 132, a predetermined internal state and external stimulus are defined correspondingly to an action stated in the elementary action module 132.

The "external stimulus" referred to herein is robot-sensed information or the like in the external-stimulus recognition unit 80, and it includes object information etc. such as color information, shape information, facial-expression information, etc. resulted from processing of an image supplied from the camera. More specifically, the object information includes, for example, color, shape, face, ordinary 3D (three-dimensional) object and hand gesture as well as motion, voice, contact, distance, location, time and number of times of communication with the user, etc.

Also, the "internal state" is an emotion such as instinct and sentiment managed by the internal-state manager 91 as mentioned above. Namely, the internal state includes fatigue, pain, nourishment, thirst, affection, curiosity, etc.

For example, an elementary action module A whose output action is "Eat" covers the type (OBJECT_ID), size (OBJECT_SIZE), distance (OBJECT_DISTANCE), etc. of an object as external stimuli, and Nourishment, Fatigue, etc. as internal states. Thus, types of an external stimulus and internal state covered by each of an elementary action module are defined, and an activation level of an action (elementary action) corresponding to the external stimulus and internal state is calculated. It should be noted that one internal state or external stimulus may of course be associated with a plurality of elementary actions as well as with a single elementary action.

Also, the internal-state manager 91 is supplied with an external stimulus and information on the residual potential of the battery, angle of rotation of the motor in the robot device, etc., and calculates and manages an internal state vector IntV (internal variable) corresponding to the plurality of internal states. More specifically, for example, the internal state "Nourishment" can be determined based on the residual potential of the battery, and the internal state "Fatigue" can be determined based on the consumed power.

Referring to the activation level calculation data base 121, the activation level calculation unit 120 calculates an activation level AL of each of the elementary action modules A to D at a certain time from an external stimulus and internal state at that time. In the embodiment of the present invention, the activation level calculation unit 120 is provided for each of the elementary action modules A to D. However, a single activation level calculation unit 120 may be used to calculate activation levels of all elementary action modules.

The "activation level AL" indicates to what extent the robot device wants to implement an elementary action module having the activation level (priority of implementation). The action selector 130 selects an elementary action module on the basis of an activation level AL of the action, and the selected elementary action module outputs an action stated therein. That is, each elementary action module has its own activation level calculation unit 120 calculates an activation level, and the action selector 130 selects an elementary action whose activation level AL is highest, for example.

An activation level AL of each elementary action module is calculated from an instinct for each action corresponding to each current internal state, satisfaction level based on the current internal state and a variation of an internal state which, it is predicted based on an external stimulus, will vary, that is, a predicted variation of the satisfaction level indicating the variation of the internal state which, it is predicted, will vary as a result of implementation of an action in response to an input external stimulus.

Taking, as an example, calculation of an activation level AL of an elementary action module A whose action output is "Eat" on the basis of internal states "Nourishment" and "Fatigue" when an object of a certain "type" and "size" exists at a certain "distance", there will be explained in detail herebelow how to calculate an activation level AL in a predetermined elementary action module A.

(2) Activation Level Calculation Unit

Figure 5:
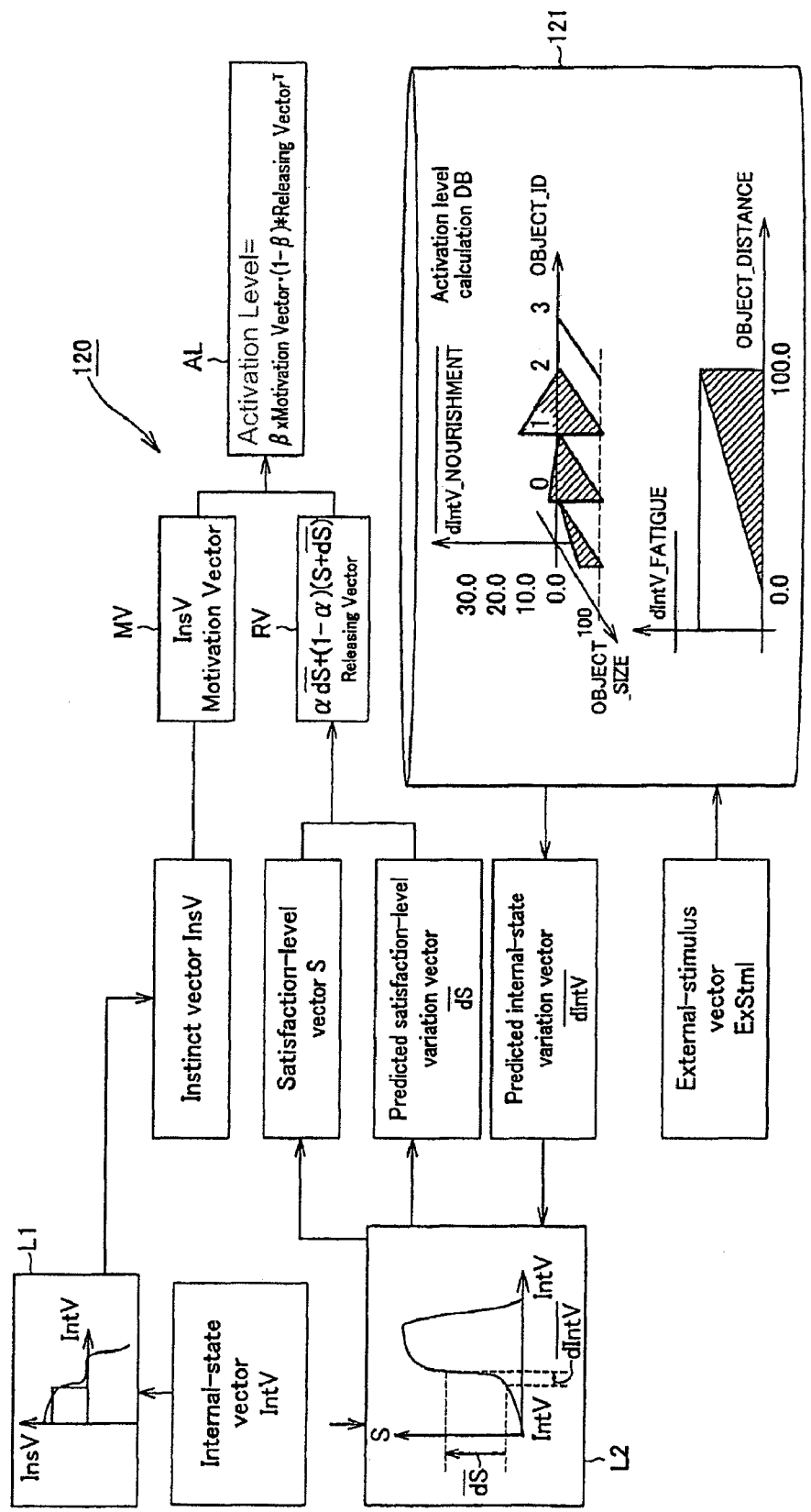
FIG. 5 is also a schematic diagram showing a flow of operations made in calibration, by an activation level calculation unit, of an activation level AL from an internal state and external stimulus.

FIG. 5 is a schematic diagram showing a flow of operations made in calibration, by the activation level calculation unit 120, of an activation level AL from an internal state and external stimulus. In the embodiment of the present invention, the internal-state vector IntV (internal variable) having more than one internal state as components is defined for each of the elementary action modules, and an internal-state vector IntV corresponding to each of the elementary action modules is provided by the internal-state manager 91. That is, each component of the internal-state vector IntV indicates the value of one internal state (internal-parameter) indicating, for example, the aforementioned emotion or the like, and it is used for calculation of an activation level of an elementary action module corresponding to each component the internal-state vector IntV has. More specifically, for the elementary action module A whose action output is "Eat", there are defined internal-state vectors "Nourishment" IntV_NOURISHMENT and "Fatigue" IntV_FATIGUE, for example.

Also, an external stimulus vector ExStml (external stimulus) having more than one external stimulus level as a component is defined for each internal state, and an external stimulus vector ExStml corresponding to each internal state, that is, an elementary action module, is provided by the external-stimulus recognition unit 80. Namely, each component of the external stimulus vector ExStml indicates recognition information such as the size and type of the aforementioned object, a distance to the object, etc. and it is used for calculation of an internal state level corresponding to each component of the external stimulus vector ExStml. More particularly, for example, an external stimulus vector ExStml "object type" OBJECT_ID and "object size" OBJECT_SIZE are defined for the internal state IntV_NOURISHMENT, while for example an external stimulus vector ExStml "distance to object" OBJECT_DISTANCE is defined for the internal state "Fatigue" IntV_FATIGUE.

The activation level calculation unit 120 is supplied with the internal-state vector IntV and external-stimulus vector ExStml, and calculates an activation level AL. More specifically, the activation level calculation unit 120 includes a first calculation block MV to determine a motivation vector indicating to what extent the robot device wants to implement an elementary action in consideration on the basis of the internal-state vector IntV, and a second calculation block RV to determine a releasing vector indicating whether the elementary action can be implemented or not on the basis of the internal-state vector IntV and external-stimulus vector ExStml. It calculates an activation level AL from these two vectors.

(2-1) Calculation of the Motivation Vector

The motivation vector as one of the elements for calculation of an activation level AL is determined as an instinct vector InsV (instinct variable) indicating an instinct for an elementary action module from the internal-state vector IntV stated in the elementary action module. For example, the elementary action module A whose action output is "Eat" has internal-state vectors IntV "IntV_NOURISHMENT" and "IntV_FATIGUE", and hence instinct vectors InsV "InsV_NOURISHMENT" and "InsV-FATIGUE" are determined as motivation vectors. That is, the instinct vector InsV will be a motivation vector for calculation of an activation level AL.

For calculation of an instinct vector InsV, there may be used such a function that when the value of an internal-state vector IntV is large, the instinct is determined to be satisfied and the instinct level is made smaller while the instinct level is made negative when the internal-state vector IntV has become larger than a predetermined value.

Figure 6:
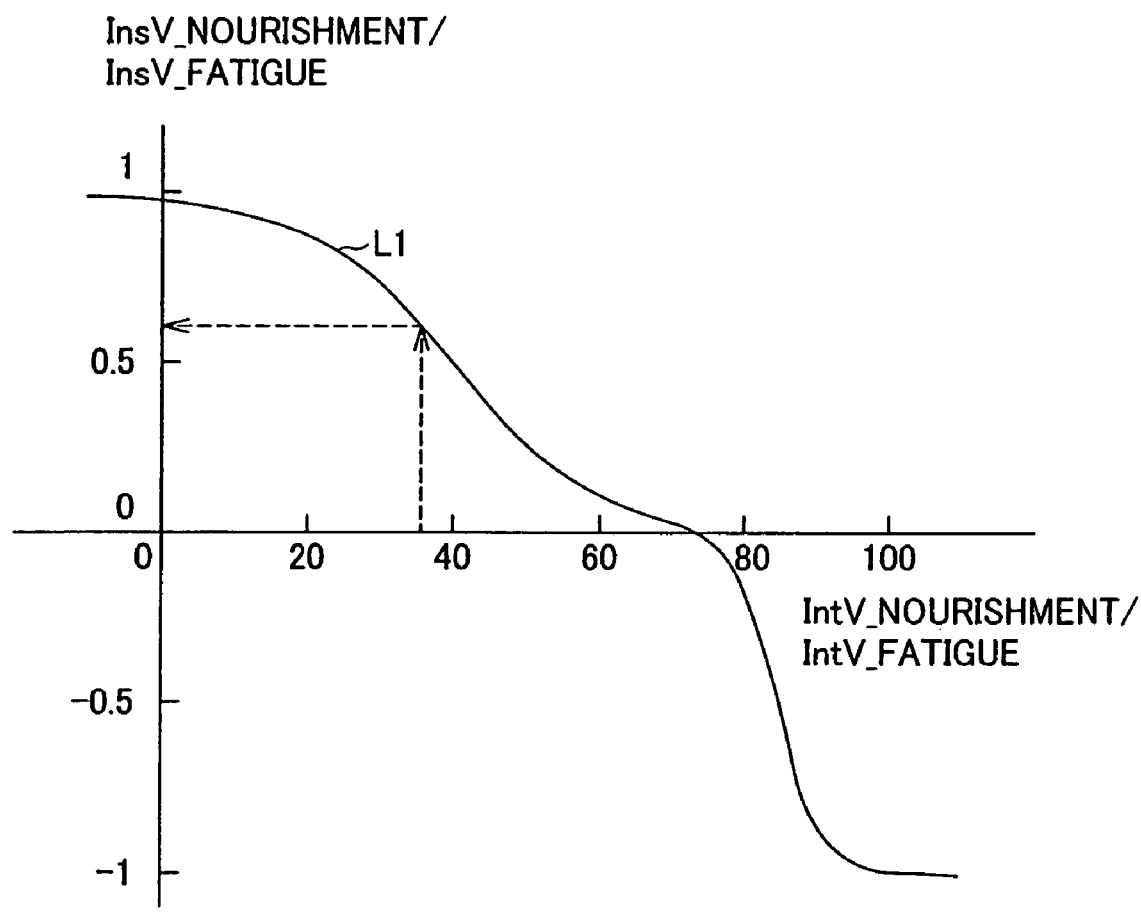
FIG. 6 graphically illustrates the relation between an internal state and external stimulus, with components of internal-state vector IntV (internal variable) being plotted along the horizontal axis and components of instinct vector InsV being plotted along the vertical axis.

More specifically, the function is given by the following equation (1) and as shown in FIG. 6. FIG. 6 graphically illustrates the relation between an internal state and instinct, with components of internal-state vector IntV being plotted along the horizontal axis and components of instinct vector InsV being plotted along the vertical axis.

$$InsV = -\frac{1}{1 + \exp(-(A \cdot IntV - B)/C)} + \frac{1}{1 + \exp((D \cdot IntV - E)/F)} \quad (1)$$

where
  IntV: Internal-state vector
  InsV: Instinct vector
  A to F: Constants

As will be known from the above equation (1) and FIG. 6, the instinct vector InsV depends upon the value of internal-state vector IntV alone. The function is such that with the value of an internal state being 0 to 100, the value of the instinct is −1 to 1. For example, by setting a curve L1 of internal state and instinct level along which the instinct level is 0 when the internal state is satisfied to about 80%, for example, the robot device will select such an action that 80% of the internal state will always be satisfied. Thus, in case an instinct corresponding to an internal state IntV_NOURISHMENT is an appetite InsV_NOURISHMENT, it is meant that when the robot device is "hungry", the robot device will have a larger appetite, while the robot device will have no more appetite when the "stomach" is filled to more than 80%. Using this theory, it is possible to have the robot device implement an action which expresses such an emotion.

By varying constants A to F in the above equation (1), a unique instinct level can be determined for each internal state. For example, with the value of an internal state being between 0 and 100, the instinct level may be varied between 1 and 0. Also, an internal state/instinct level function different from the equation (1) may be prepared for each internal state.

(2-2) Calculation of the Releasing Vector

On the other hand, the releasing vector as the other element for calculation of an activation level AL is calculated from a satisfaction-level vector S (satisfaction) determined from an internal-state vector IntV and a predicted satisfaction-variation vector determined from an external-stimulus vector ExStml.

First, a predicted internal-state variation vector as given by the following equation (2) which indicates an internal state which will be attained after implementation of an action and a current internal state is determined from an internal state defined in each elementary action module and an external stimulus defined for this internal state:

$$d\overline{IntV} = \{dIntV\_NOURISHMENT, dIntV\_FATIGUE\} \quad (2)$$

where
$d\overline{IntV}$: Predicted internal-state variation vector
$d\overline{IntV}\_NOURISHMENT$: Predicted variation of internal state "Nourishment"
$d\overline{IntV}\_FATIGUE$: Predicted variation of internal state "Fatigue"

The "predicted internal-state variation vector" indicates a predicted variation of the current internal-state vector, which is possible after implementation of an action. It can be determined by referring to an activation level calculation data in the activation level calculation data base 121 the activation level calculation unit 120 can refer to. The activation level calculation data is a description of a correspondence between an external-stimulus vector and a predicted internal-state variation vector that is possible after implementation of an action. By referring to this data base, the activation level calculation unit 120 can acquire a predicted internal-state variation vector corresponding to an input external-stimulus vector.

Note that the composition of the activation level calculation data base 121 will be described in detail later. Here will first be described how to determine a predicted internal-state variation and predicted instinct-level variation from the activation level calculation data base.

Figure 7A:
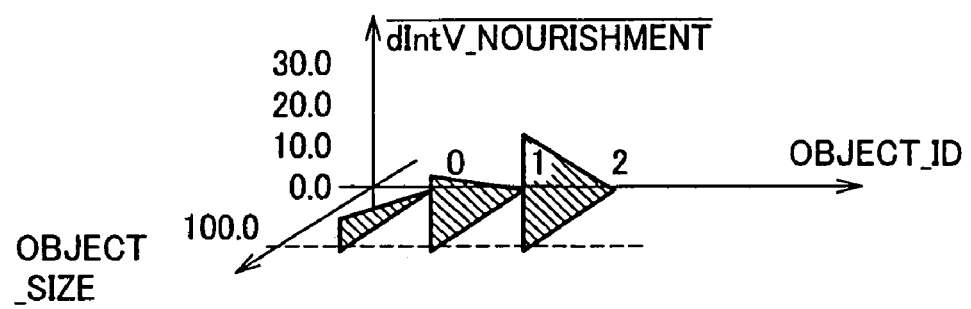
FIGS. 7A and 7B show activation-level calculation data on an internal state "Nourishment" and internal state "Fatigue", respectively, in an activation level calculation data base.
Figure 7B:
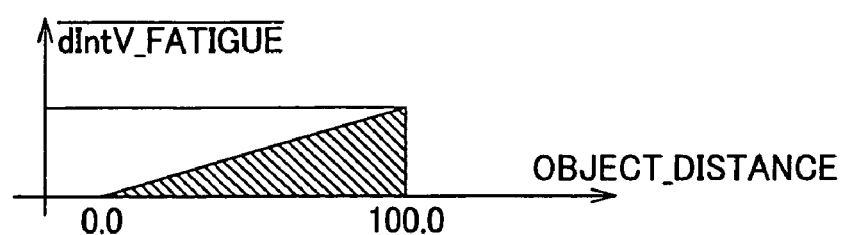

The activation level calculation data to be registered in the activation level calculation data base may be those shown in FIGS. 7A and 7B. FIG. 7A shows the activation-level calculation data on an internal state "Nourishment". As will be known, as a result of implementation of an action output "Eat" of the elementary action module, the larger the object size (OBJECT_SIZE) the more the internal state "Nourishment" will be satisfied by the object M1 whose OBJECT_ID corresponds to OBJECT_ID=1 rather than the object M1 corresponding to OBJECT_ID=0 and by the object M3 corresponding to OBJECT_ID=2 rather than the object M2 corresponding to OBJECT_ID=1. Namely, the "Nourishment" will be satisfied.

FIG. 7B shows the activation-level calculation data on an internal state "Fatigue". As a result of implementation of the action output "Eat" of the elementary action module, the larger the distance to the object "OBJECT_DISTANCE", the more the internal state "Fatigue" will be satisfied. Namely, the robot device will be fatigued.

More specifically, the internal-state vector IntV and external-stimulus vector InsV are defined for each of elementary actions as above. So, in case a vector having an object size and object type as components of an external-state vector ExStml is supplied, there will be determined a predicted internal-state variation corresponding to an action result of the elementary action module A for which there is defined an internal-state vector having an internal state IntV_NOURISHMENT for which the external-stimulus vector ExStml is defined. In case a vector having a distance to the object is supplied, there will be determined a predicted internal-state variation corresponding to an action result of the elementary action module A for which there is defined an internal-state vector having an internal state IntV-FATIGUE for which the external-stimulus vector ExStml is defined.

Next, a satisfaction-level vector S as given by the following equation (3) is calculated from the internal-state vector IntV, and an predicted satisfaction-level variation vector as given by the following equation (4) is determined from the predicted internal-state variation vector given by the above equation (2):

$$S = \{S\_NOURISHMENT, S\_FATIGUE\} \quad (3)$$

where
S: Satisfaction-level vector
S_NOURISHMENT: Level of satisfaction with internal state "Nourishment"
S_FATIGUE: Level of satisfaction with internal state "Fatigue"

$$d\overline{S} = \{dS\_NOURISHMENT, dS\_FATIGUE\} \quad (4)$$

where
$d\overline{S}$: Predicted satisfaction-level vector
$d\overline{S}\_NOURISHMENT$: Predicted variation of satisfaction level with internal state "Nourishment"
$d\overline{S}\_FATIGUE$: Predicted variation of satisfaction with internal state "Fatigue"

For calculation of the satisfaction-level vector S for the internal-state vector IntV, functions as given by the following equations (5-1) and (5-2) are available for the components IntV_NOURISHMENT and IntV_FATIGUE, respectively, of the internal-state vector [IntV_NOURISHMENT, IntV_FATIGUE] defined in the elementary action module A:

$$\text{Satisfaction(NOURISHMENT)} = \quad (5\text{-}1)$$
$$-1 + \frac{1}{1 + \exp(-(A \cdot IntV - B)/C)} + \frac{1}{1 + \exp((D \cdot IntV - E)/F)}$$

$$\text{Satisfaction(FATIGUE)} = \quad (5\text{-}2)$$
$$1 - \frac{1}{1 + \exp(-(A \cdot IntV - B)/C)} - \frac{1}{1 + \exp((D \cdot IntV - E)/F)}$$

where A to F: Constants

Figure 8:
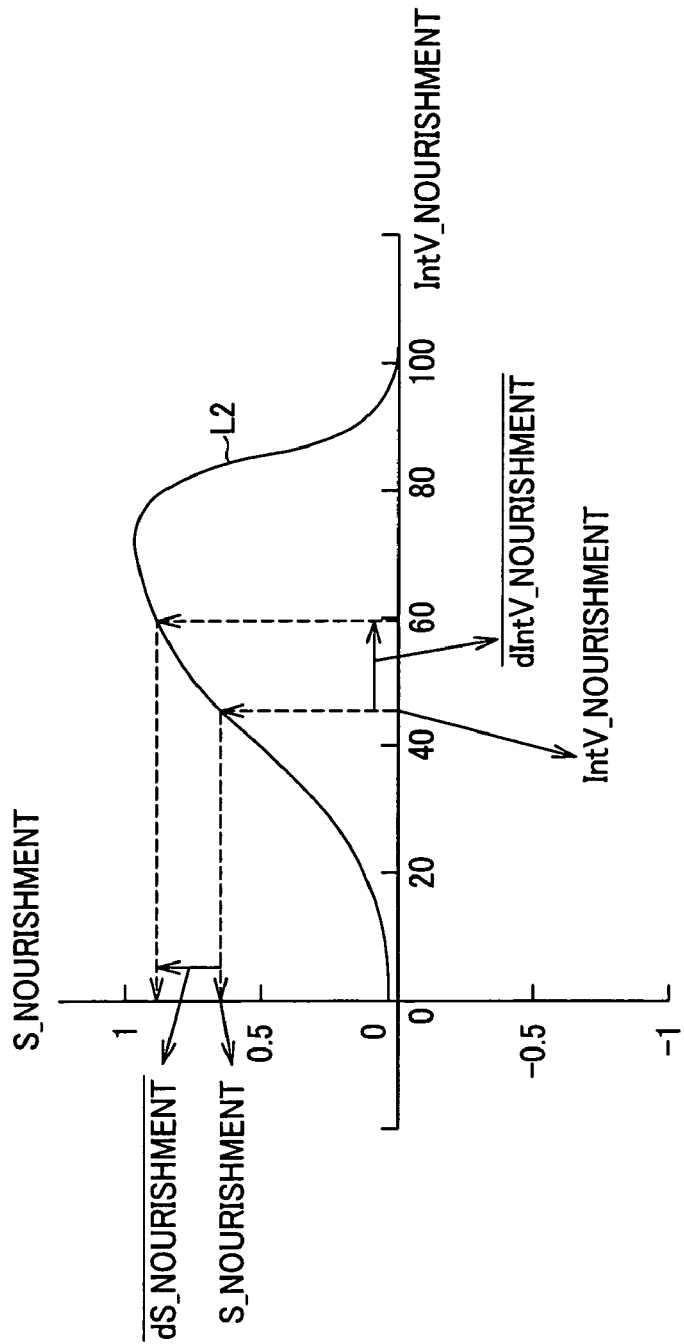
FIG. 8 graphically illustrates the relation between the internal state and satisfaction level, with the "Nourishment" IntV_NOURISHMENT being plotted along the horizontal axis and the satisfaction level S_NOURISHMENT being plotted along the vertical axis.
Figure 9:
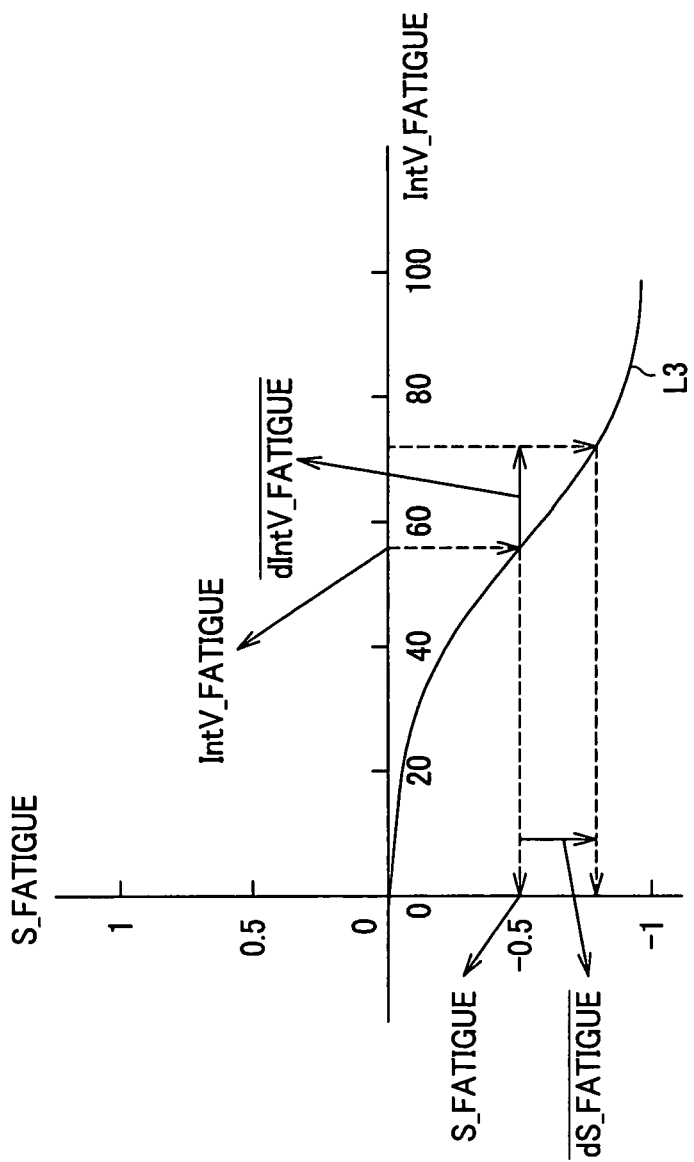
FIG. 9 graphically illustrates the relation between the internal state and satisfaction level, with the "Fatigue" IntV_FATIGUE being plotted along the horizontal axis and the level of satisfaction S-FATIGUE with the internal state "Fatigue" being plotted along the vertical axis.

FIGS. 8 and 9 graphically illustrate the functions shown in the equations (5-1) and (5-2), respectively. FIG. 8 shows the relation between the internal state and satisfaction level with the "Nourishment" IntV_NOURISHMENT being plotted along the horizontal axis and the satisfaction level S_NOURISHMENT being plotted along the vertical axis. FIG. 9 shows the relation with the internal state IntV_FATIGUE being plotted along the horizontal axis and the level of the satisfaction S-FATIGUE with the internal state "Fatigue" being plotted along the vertical axis.

In the function shown in FIG. 8, the value IntV_NOURISHMENT of the internal state "Nourishment" takes a value of 0 to 10 and the level of the satisfaction S_NOURISH- MENT with the internal state takes a value of 0 to 1 (all values being positive). The function depicts such a curve L2 that the satisfaction level goes larger from 0 with the internal-state value being in a range of 0 to 80, then decreases and returns to 0 when the internal-state value reaches 100. More specifically, the satisfaction level S_NOURISHMENT calculated from a current internal state "Nourishment" (IntV_NOURISHMENT=40) (at a certain time) and predicted satisfaction-level variation corresponding to a predicted internal-state variation (20 from 40 to 80) of an internal state "Nourishment" determined as in FIG. 7A are both positive.

FIG. 5 shows only the function L2, but the function as shown in FIG. 9 may be used. That is, in the function shown in FIG. 9, the value IntV_FATIGUE of the internal state "Fatigue" takes a value of 0 to 100 and the level of the satisfaction S_FATIGUE with the internal state takes a value of 0 to −1 (all values being negative). The function depicts such a curve L3 that the larger the internal state, the lower the satisfaction level becomes. The satisfaction level S_FATIGUE calculated from the value of the current internal state "Fatigue" is negative. When the predicted internal-state variation of the internal state "Fatigue" given as in FIG. 7A is positive, the predicted satisfaction-level variation will be negative.

By setting the constants A to F to be variable in the functions given by the equations (5-1) and (5-2), it is possible to set a function which provides different levels of satisfaction with different internal states.

By determining, by the following equation (6), to what extent the internal state should be satisfied by an external stimulus after action is implemented, it is possible to determine a releasing vector which is another element for calculation of an activation level AL:

$$\text{ReleasingVector} = \alpha \cdot d\overline{S} + (1-\alpha)(S+d\overline{S}) \quad (6)$$

where α: dS̄/S ratio
dS̄: Predicted satisfaction-level variation vector
S+dS̄: Predicted satisfaction-level vector Note here that there will be such a tendency that when the term α in the equation (6) is large, the releasing vector greatly depends upon a predicted satisfaction-level variation, that is, how high a satisfaction level can be attained after an action is implemented, namely, a value indicating an increase of the satisfaction level, and that when the term α is small, the releasing vector greatly depends upon a predicted satisfaction level, that is, a value indicating a satisfaction level which will be attained after an action is implemented.

(2-3) Calculation of the Activation Level AL

An activation level AL is finally calculated as given by the following equation (7) from a motivation vector and releasing vector calculated as above:

$$\text{ActivationLevel} = \beta \text{MotivationVector} \cdot (1-\beta) \text{ReleasingVector}^T \quad (7)$$

where β: Motivation/Releasing ratio

Note here that there is such a tendency that the activation level AL greatly depends upon the internal state (instinct level) when "β" is large but upon the external stimuli (predicted satisfaction-level variation and satisfaction level) when "β" is small. Thus, an instinct level, satisfaction level and predicted satisfaction level are calculated from the internal-state value (internal-state vector IntV) and external-stimulus value (external-stimulus vector ExStml), and an activation level AL can be calculated based on these instinct level, satisfaction level and predicted satisfaction level.

Then, the action selector 130 selects an action on the basis of the above activation level AL. So, even if the action selector 130 is supplied the same external stimulus, it will select a different depending upon the value of the current internal state.

(2-4) Activation Level Calculation Data Base

Next, there will be explained the structure of activation level calculation data in the activation level calculation data base 121 and how to refer to the data base. As described above, the activation level calculation data is used to determine a predicted internal-state variation in response to an input external stimulus. In an external-stimulus vector space, a typical point (external stimulus value) is defined for an internal state defined for each elementary action. A predicted internal-state variation indicative of a predictable variation of the internal state is defined on the typical point. When the input external stimulus takes a value on the typical point in the defined external-stimulus vector space, the predicted internal-state variation will take the value defined on the typical point.

Figure 10A:
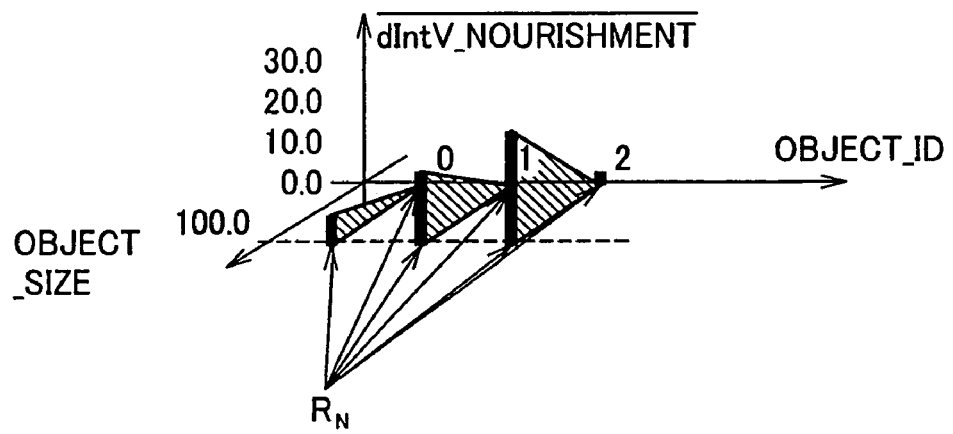
FIGS. 10A and 10B show examples of an activation level calculation data structure for determination of predicted internal-state variations of the internal states "Nourishment" and "Fatigue", respectively.
Figure 10B:
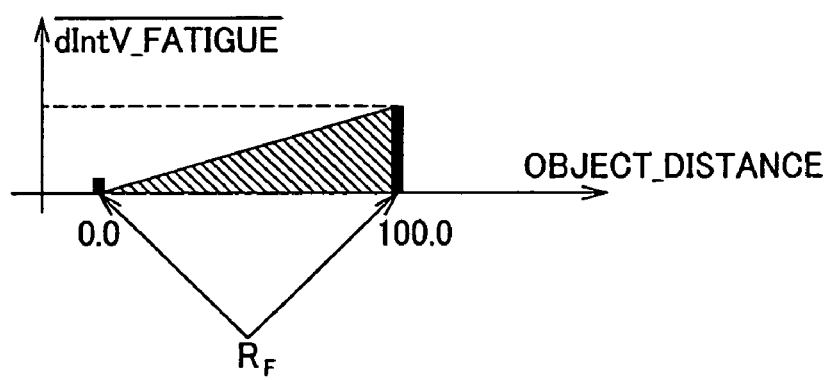

FIGS. 10A and 10B graphically illustrate examples of the structure of an activation level calculation data structure. As shown in FIG. 10A, for determination of a predicted internal-state variation of an internal state "Nourishment", a typical point (OBJECT_ID, OBJECT_SIZE) in the external-stimulus vector space and a predicted internal-state variation corresponding to the typical point $R_N$ and $R_F$ are defined as shown in Table 1 below:

TABLE 1

| External-stimulus vector (OBJECT_ID, OBJECT_SIZE) | Predicted internal-state variation IntV_NOURISHMENT |
|---|---|
| (0, 0.0) | 0.0 |
| (0, 100.0) | 10.0 |
| (1, 0.0) | 0.0 |
| (1, 100.0) | 20.0 |
| (2, 0.0) | 0.0 |
| (2, 100.0) | 30.0 |

As shown in FIG. 10B, for determination of a predicted internal-state variation of an internal state "Fatigue", a typical point (OBJECT_DISTANCE) in the external-stimulus vector space and a predicted internal-state variation corresponding to this typical are defined as shown in Table 2 below:

TABLE 2

| External-stimulus vector (OBJECT_DISTANCE) | Predicted internal-state variation IntV_FATIGUE |
|---|---|
| (0.0) | 0.0 |
| (100.0) | 20.0 |

Since the predicted internal-state variation is defined only on the typical point in the external-stimulus vector space as above, no value other than the defined typical point in the external-stimulus vector space will possible depending upon the type of external stimulus (e.g., OBJECT_DISTANCE or OBJECT_SIZE). In this case, the predicted internal-state variation can be determined by the linear interpolation from the typical point near the input external stimulus.

Figure 11:
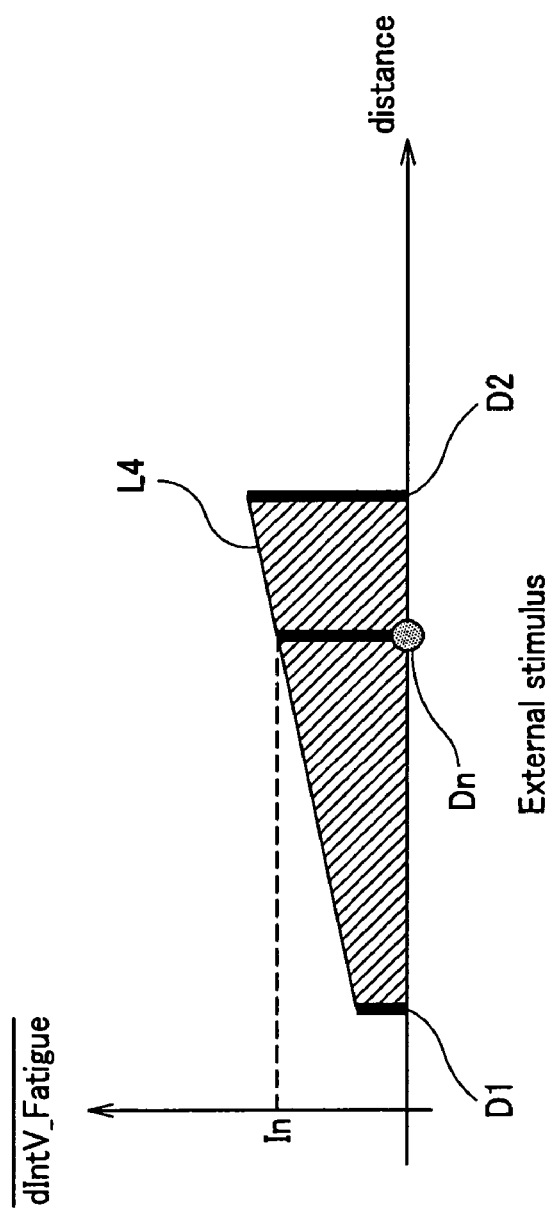
FIG. 11 explains the linear interpolation of a one-dimensional external stimulus.
Figure 12:
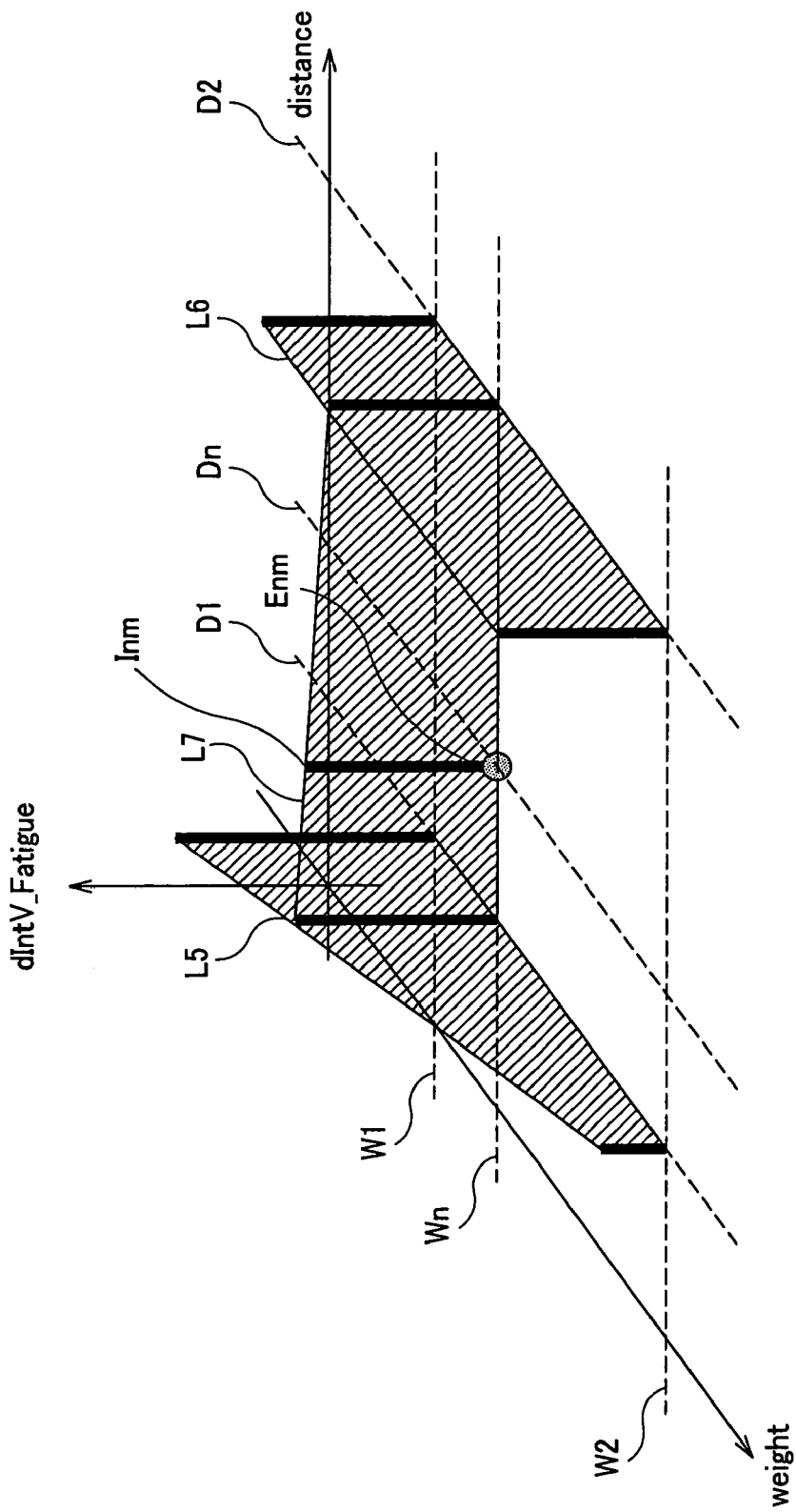
FIG. 12 explains the linear interpolation of a two-dimensional external stimulus.

FIGS. 11 and 12 explain the linear interpolation of one- and two-dimensional external stimuli. In case a predicted internal-state variation is to be determined from one external stimulus (OBJECT_DISTANCE) as shown in FIG. 10B, that is, in case one external stimulus is defined for one internal state, the external stimulus is plotted along the horizontal axis and a predicted internal-state variation corresponding to the external stimulus is plotted along the vertical axis as shown in FIG. 11, and an protected internal-state variation In of an input external stimulus Dn can be determined on such a straight line L4 as indicates predicted internal-state variations defined on typical points D1 and D2 as parameters of the external stimulus (OBJECT_DISTANCE).

Also, in case an external stimulus OBJECT_WEIGHT to be supplied as an input in response to an internal state has been defined in addition to the external stimulus OBJECT_DISTANCE shown in FIG. 11 for example as an external stimulus from two components as shown in FIG. 12, typical points (D1, W1), (D1, W2), (D2, W1) and (D2, W2) as predetermined parameters of each external stimulus are defined. In case there are predicted internal-state variations corresponding to the parameters, when external stimuli Enm (Dn, Wn) different from the above four typical points are supplied as inputs, a straight line L5 is first determined which passes by predicted internal-state variations defined on the typical points W1 and W2 of the external stimulus OBJECT_WEIGHT when OBJECT_DISTANCE=D1, and a straight line L6 is determined which passes by predicted internal-state variations defined on the typical points W1 and W2 of the external stimulus OBJECT_WEIGHT when OBJECT_DISTANCE=D2. Then, predicted internal-state variations on the two straight lines L5 and L6 corresponding to one, Wn for example, of the two input external stimuli Enm are determined, and a straight line L7 connecting these two predicted internal-state variations is determined, and a predicted internal-state variation corresponding to the other external stimulus Dn supplied as the input is determined along the straight line L7. Thus, a predicted internal-state variation Inm corresponding to the external stimulus Enm can be determined using the linear interpolation.

(2-5) Calculation of the Activation Level

Next, how to calculate an activation level in the activation level calculation unit 120 shown in FIG. 5 will be described with reference to the flow diagram shown in FIG. 13.

Figure 13:
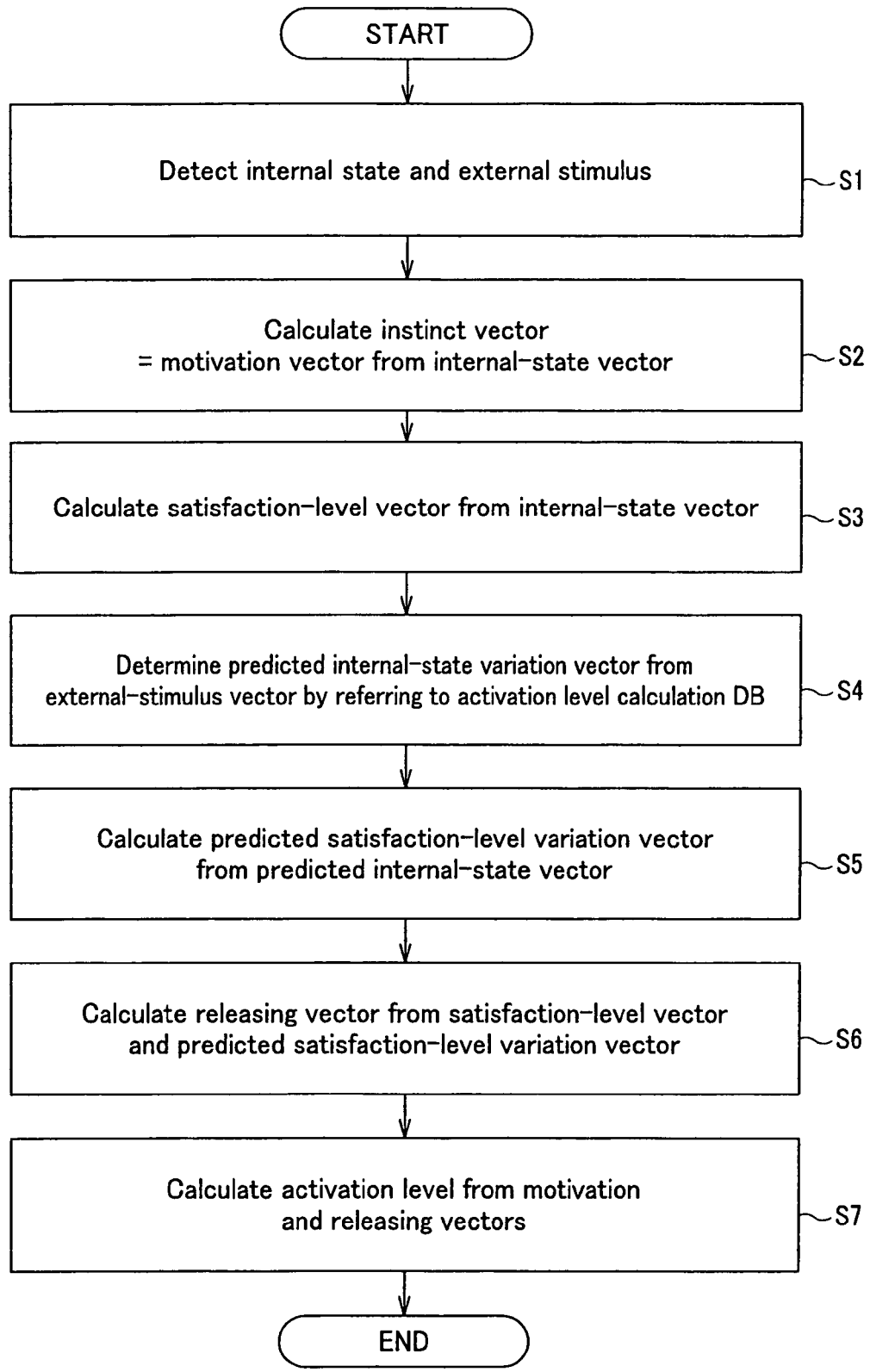
FIG. 13 shows a flow of operations made in calculation of an activation level in the activation level calculation unit.

As shown in FIG. 13, first, when an external stimulus is recognized by the external-stimulus recognition unit 80 shown in FIG. 4, it is supplied to the activation level calculation unit 120. At this time, the internal-state manager 91, informed of the external-stimulus recognition from the external-stimulus recognition unit 80, for example, will be supplied with each internal state from the internal-state manager 91 (in step S1).

Next, from each supplied internal state, a corresponding instinct level is calculated with the use of the aforementioned function (1), for example, as above to thereby calculate an instinct-level vector IntV which is a motivation vector from an internal-state vector (in step S2).

Also, the activation level calculation unit 120 calculates, from each supplied internal state, a corresponding satisfaction level with the use of the aforementioned equations (5-1) and (5-2), to thereby calculate a satisfaction-level vector S from the internal-state vector IntV (in step S3).

On the other hand, a predicted internal-state variation which is possible as a result of the implementation of an action is determined from the supplied external stimulus (external-stimulus vector (in step S4). Using the same function as in step S3, a predicted satisfaction-level variation is determined which corresponds to the predicted internal-state variation (in step S5), and the equation (6) is used to determine a releasing vector from the predicted satisfaction-level variation thus obtained and the satisfaction-level vector having been determined in step S3 (in step S6).

Finally, the aforementioned equation (7) is used to calculate an activation level AL from e motivation vector determined in step S2 and releasing vector determined in step S6.

Note that in the foregoing, it has been explained that the calculation of activation level AL in the activation level calculation unit 120 in steps S1 to S7 is made each time an external stimulus is recognized but is may be done in a predetermined timing, for example. Also, when an external stimulus is recognized and an activation level is calculated, only an instinct level and satisfaction level may be calculated for an internal state corresponding to the recognized external stimulus or instinct levels and satisfaction levels may be calculated for all internal states.

According to the present invention, the robot device can be made to implement an unwearing action to the user, as an entertainment robot, by calculating an activation level AL on the basis of an internal state and external stimulus and selecting the action on the basis of the activation level AL.

Also, an external stimulus other than a typical point is supplied from the sensor to the activation level calculation unit 120 due to a noise or the like as the case may be. Even in such a case, it is possible to update the predicted internal-state variation at a near typical point proportionally with a distance from the typical point by calculating the predicted internal-state variation by means of the linear interpolation and determine the predicted internal-state variation with less amount of calculation.

Note that the present invention is not limited to the embodiment having been described above but can of course be modified in various manners without departing from the scope and spirit thereof as set forth and defined in the appended claims. For example, there may be provided a learning means for updating the aforementioned activation level calculation data base. That is, the learning means can be used to learn a predicted internal-state variation vector from an internal-state variation vectors in the activation level calculation data as will be described below.

(3) Learning of the Activation Level Calculation Data Base

Here will be described how to learn a predicted internal-state variation vector in the above activation level calculation data from an internal-state variation vector after the robot device implants an action. The learning means for learning the activation level calculation data base permits the robot device to update the activation level calculation data base at any time in response to an interaction with the user and correspondingly to the surroundings, and to implement different actions in response to the same external stimulus depending upon the result of learning, thereby assuring an unwearing action to the user. For such learning of the activation level calculation data, a teacher signal is required. An actual internal-state variation depending upon the result of an action, for example, may be used as the teacher signal to learn a predicted internal-state variation resulted in response to an external stimulus.

Figure 14:
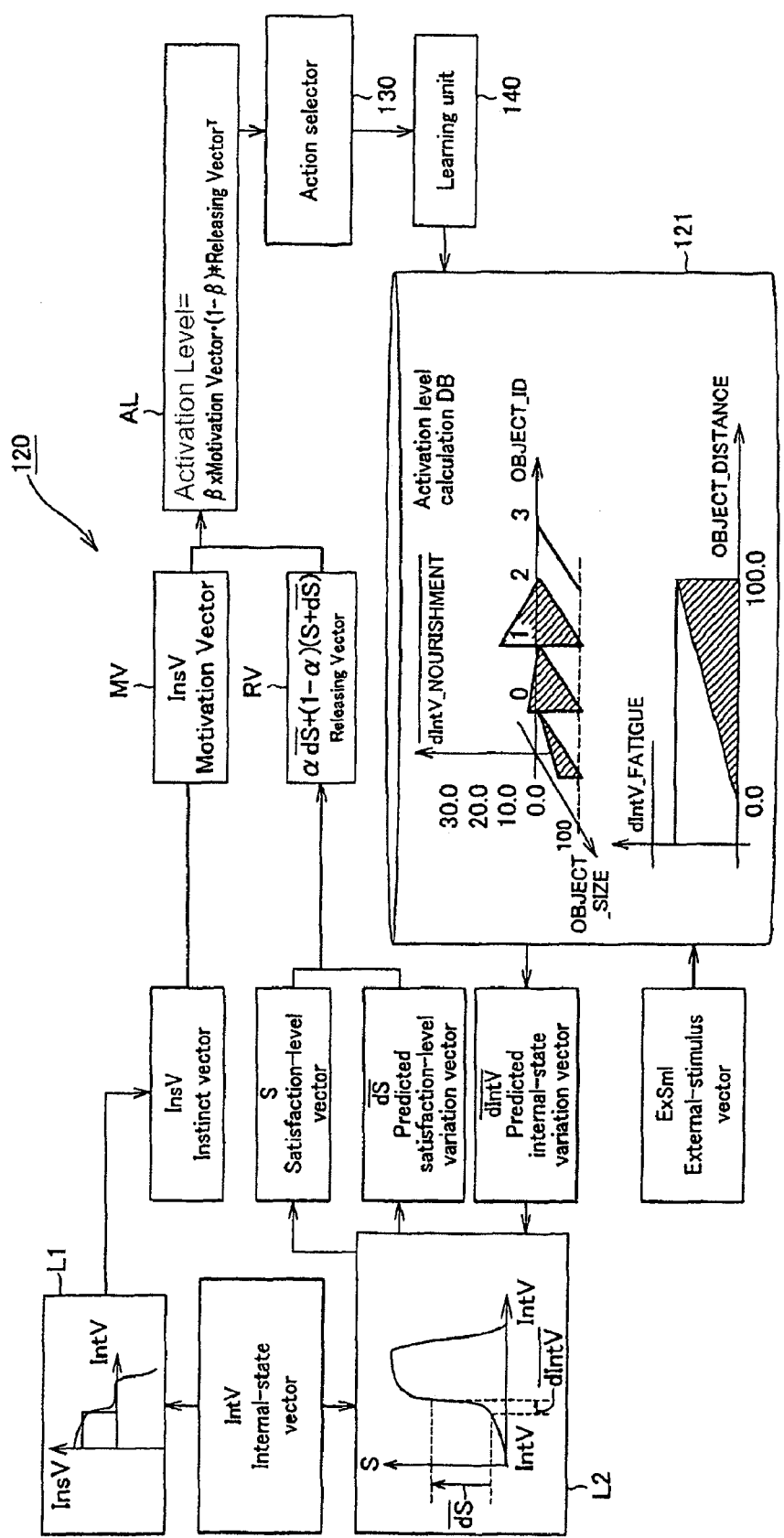
FIG. 14 is a schematic diagram showing a flow of operations made in a control system included in the robot device as the embodiment of the present invention and ranging from input of an external stimulus to learning of the activation level calculation data base.

FIG. 14 is a schematic diagram showing a flow of operations ranging from input of an external stimulus to learning of the activation level calculation data base. As shown in FIG. 5, an activation level AL is calculated referring to the activation level calculation data base 121 with a predicted internal-state variation vector being taken as a "pupil signal", and the action selection unit selects an elementary action module whose activation level AL is the greatest, for example, based on the value of the activation level AL. The selected elementary action module provides an output action and the robot device will implement the action.

As a result of the action implementation by the robot device, the internal-state manager 91 shown in FIG. 4 varies its own internal state. That is, the internal-state manager 91 will vary the internal state correspondingly to the time lapse after the action implementation or to the result of the action. More particularly, on the assumption that the internal state "Nourishment" is determined based on the residual potential of the battery in the robot device, and the internal state "Fatigue" depends upon the power consumption, for example, the residual potential of the battery will be lower due to the action implementation and thus the internal state "Nourishment" will also be lower in level, and the internal state "Fatigue" will be larger in proportion with the magnitude of the power consumption caused by the action implementation.

As the result of actual action implementation, the internal state of the robot device varies, and the variation of the internal state after the action implementation can be determined. As shown in FIG. 14, the internal-state variation vector dIntV obtained after the action implementation will be a teacher signal, an internal-state variation vector predicted before the action implementation will be learnt by the learning unit 140, and the activation level calculation data base 121 will be updated correspondingly to the learnt vector.

The method of learning varies depending upon whether the input external stimulus is a one on the typical point. First, in case a necessary external stimulus for calculating an activation level of a certain selected elementary action takes a value on a typical point, the following equation (8) is used to update the predicted internal-state variation on the typical point on the basis of an actual internal-state variation:

$$\overline{dIntV} = (1-\gamma)\overline{dIntV} + \gamma IntV \qquad (8)$$

where $\overline{dIntV}$: Predicted internal-state variation vector
dIntV: Internal-state variation vector
$\gamma$: Learning rate Also, in case a necessary external stimulus for calculating an activation level of a certain selected elementary action takes a value on other than a typical point, a predicted internal-state variation on a typical point near the external stimulus, that is, on a typical point used for the linear interpolation, is to be learnt. For each external stimulus, the equation (8) is multiplied by a ratio between the external stimulus and a distance to the typical point to update the predicted internal-state variation.

Figure 15:
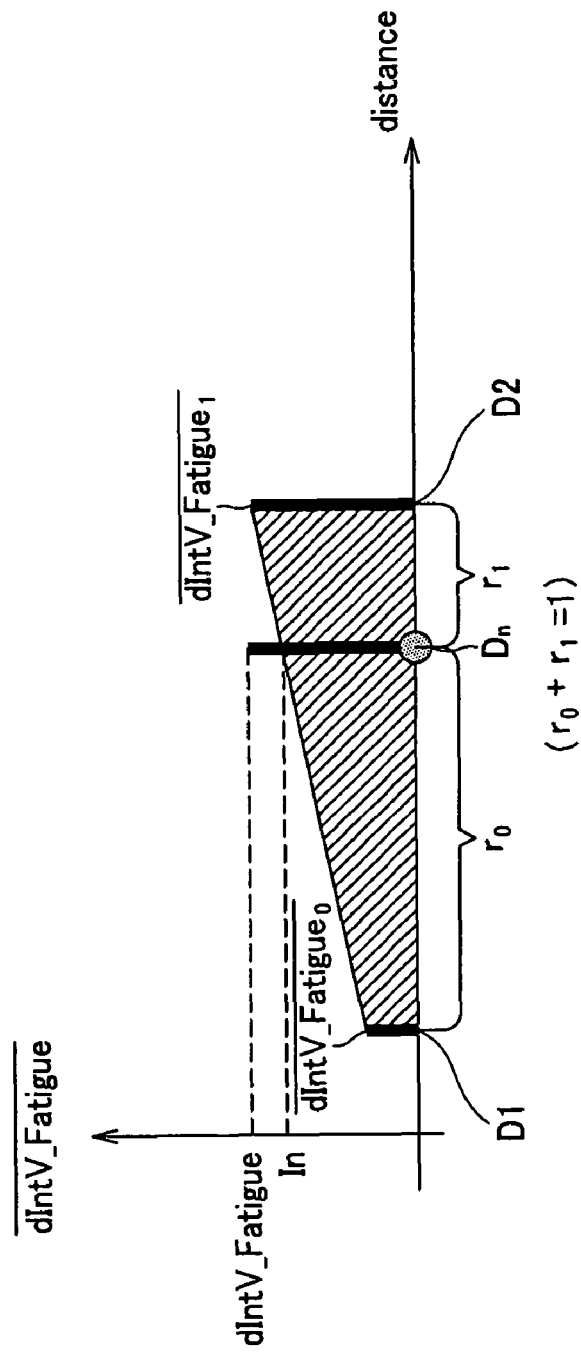
FIG. 15 explains an example of updating of a predicted internal-state variation corresponding to a one-dimensional external stimulus.
Figure 16:
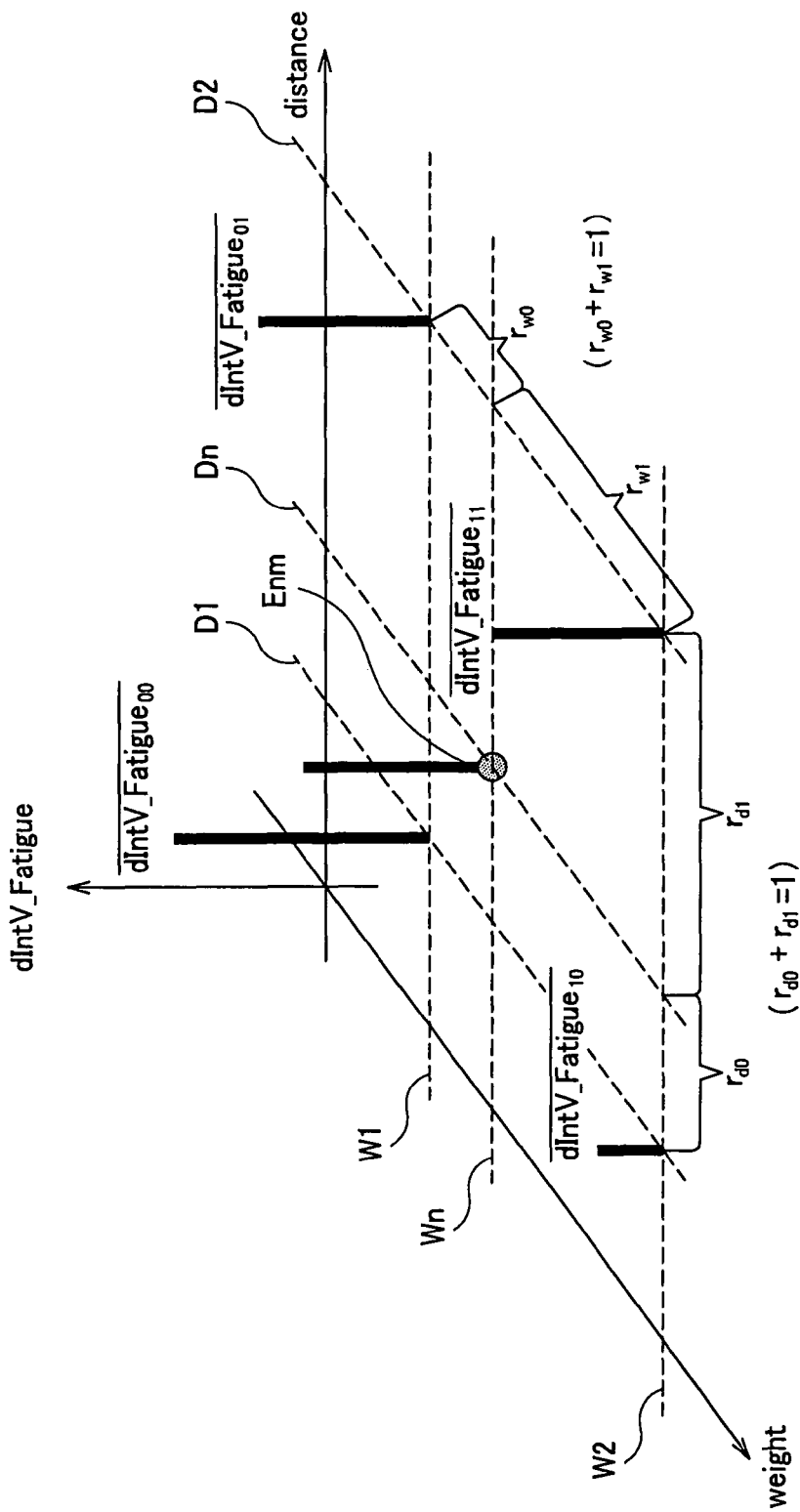
FIG. 16 explains an example of updating of a predicted internal-state variation corresponding to a two-dimensional external stimulus.

FIGS. 15 and 16 are schematic diagrams explaining examples of updating of a predicted internal-state variation corresponding to a one-dimensional external stimulus and a predicted internal-state variation corresponding to a two-dimensional external stimulus, respectively. As shown in FIG. 15, in case an external stimulus Dn is supplied as an input and the external stimulus Dn is not on any typical point, typical points D1 and D2 near the external stimulus Dn are linearly interposed to determine a predicted internal-state variation In before implementation of an action as having been described above. Then, after the action implementation, an actual internal-state variation (dIntV_Fatigue) is determined, predicted internal-state variations on the typical points D1 and D2 are learnt from the distances between the typical points D1 and D2 and external stimulus Dn and learning rate $\gamma$, and the predicted internal-state variations on the typical points D1 and D2 are updated as given by the following equations (9-1) and (9-2):

$$\overline{dIntV\_Fatigue_0}(new) = \gamma dIntV\_Fatigue + (1-\gamma) \overline{dIntV\_Fatigue_0} \cdot r_1 \qquad (9-1)$$

$$\overline{dIntV\_Fatigue_1}(new) = \gamma dIntV\_Fatigue + (1-\gamma) \overline{dIntV\_Fatigue_1} \cdot r_0 \qquad (9-2)$$

where $r_0 + r_1 = 1$
where $r_0$: Ratio of distance between typical point D1 and external stimulus Dn to distance between typical points D1 and D2
$r_1$: Ratio of distance between typical point D2 and external stimulus Dn to distance between typical points D1 and D2
dIntV_Fatigue: Internal-state variation
$\gamma$: Learning rate
$\overline{dIntV\_Fatigue_0}(new)$, $\overline{dIntV\_Fatigue_1}(new)$: Predicted variation of internal state "Fatigue" after learning at typical points D1 and D2
$\overline{dIntV\_Fatigue_0}$, $\overline{dIntV\_Fatigue_1}$: Predicted variation of internal state "Fatigue" before learning at typical points D1 and D2

Also, also in case two external stimuli are supplied as inputs, predicted internal-state variations corresponding to typical points (D1, W1), (D1, W2), (D2, W1) and (D2, W2) near the input external stimuli, used for determination of a predicted internal-state variation Inm corresponding to an external stimulus Enm (Dn, Wn) by the linear interpolation before implementation of an action as above are learnt and updated as given by the following equations (10-1), (10-2), (10-3) and (10-4):

$$\overline{dIntV\_Fatigue_{00}}(new) = \gamma dIntV\_Fatigue + (1-\gamma) \overline{dIntV\_Fatigue_{00}} \cdot r_{d1} \cdot r_{w1} \qquad (10-1)$$

$$\overline{dIntV\_Fatigue_{01}}(new) = \gamma dIntV\_Fatigue + (1-\gamma) \overline{dIntV\_Fatigue_{01}} \cdot r_{d0} \cdot r_{w1} \qquad (10-2)$$

$$\overline{dIntV\_Fatigue_{10}}(new) = \gamma dIntV\_Fatigue + (1-\gamma) \overline{dIntV\_Fatigue_{10}} \cdot r_{d1} \cdot r_{w0} \qquad (10-3)$$

$$\overline{dIntV\_Fatigue_{11}}(new) = \gamma dIntV\_Fatigue + (1-\gamma) \overline{dIntV\_Fatigue_{11}} \cdot r_{d0} \cdot r_{w0} \qquad (10-4)$$

where $\overline{dIntV\_Fatigue_{00}}(new)$, $\overline{dIntV\_Fatigue_{01}}(new)$, $\overline{dIntV\_Fatigue_{10}}(new)$, $\overline{dIntV\_Fatigue_{11}}(new)$: Predicted variation of internal state "Fatigue" after learning at typical points (D1, W1), (D2, W1), (D1, W2) and (D2, W2)
$\overline{dIntV\_Fatigue_{00}}$, $\overline{dIntV\_Fatigue_{01}}$, $\overline{dIntV\_Fatigue_{10}}$, $\overline{dIntV\_Fatigue_{11}}$: Predicted variation of internal state "Fatigue" before learning at typical points (D1, W1), (D2, W1), (D1, W2) and (D2, W2)

$$r_{d0} + r_{d1} = 1$$

where $r_{d0}$: Ratio of distance between typical point W1 and external stimulus Wn to distance between typical points W1 and W2
$r_{d1}$: Ratio of distance between typical point W2 and external stimulus Wn to distance between typical points W1 and W2

$$r_{w0} + r_{w1} = 1$$

where $r_{w0}$: Ratio of distance between typical point D1 and external stimulus Dn to distance between typical points D1 and D2
$r_{w1}$: Ratio of distance between typical point D2 and external stimulus Dn to distance between typical points D1 and D2
dIntV_Fatigue: Internal-state variation
$\gamma$: Learning rate (4) Learning the Activation Level Calculation Data Base Next, updating, by the learning unit 140 shown in FIG. 14, of activation level calculation data base correspondingly to an implemented action will be explained with reference to the flow diagram in FIG. 17.

Figure 17:
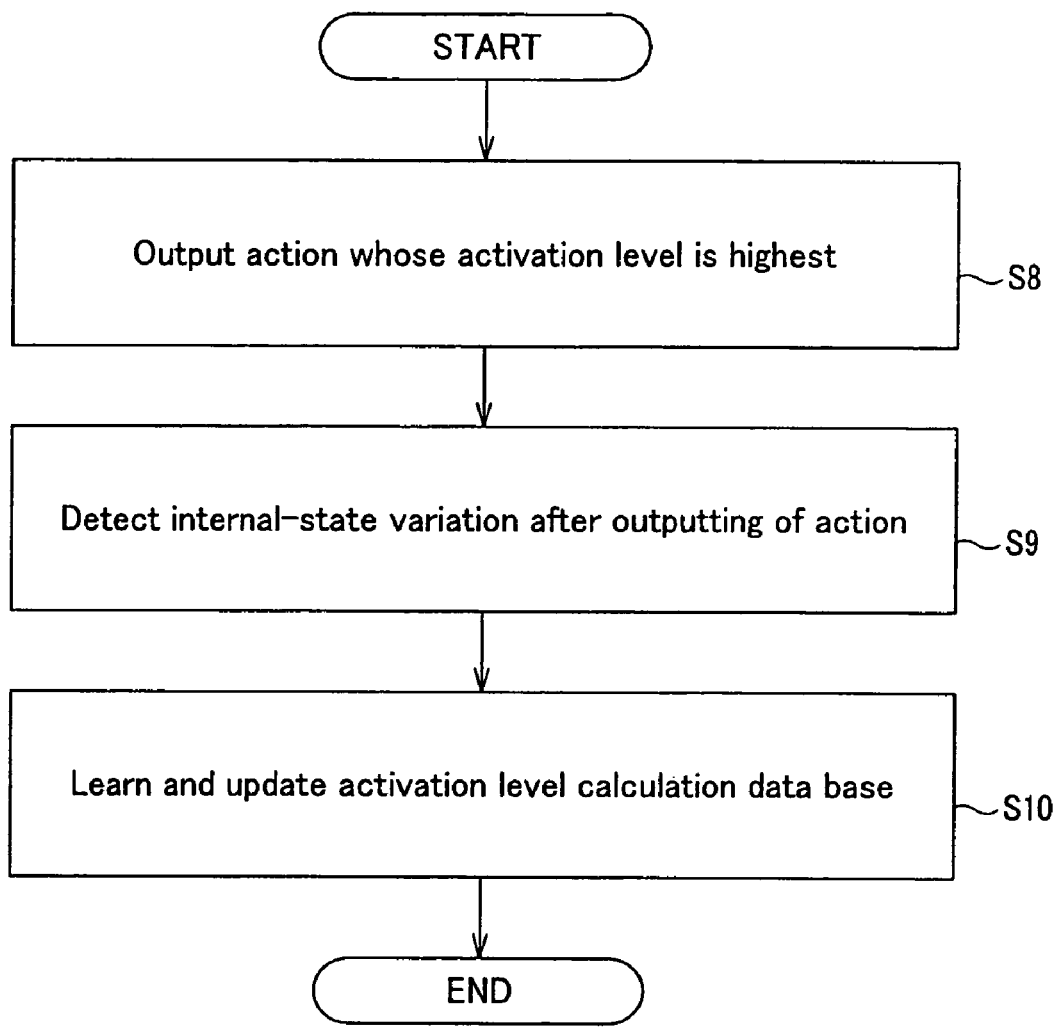
FIG. 17 shows a flow of operations made in updating, through learning, the activation level calculation data base correspondingly to a result of an action made.

First, the result of activation level calculation for all elementary actions is monitored by the action selector 130 as shown in FIG. 17 on the basis of the activation level AL calculated by the activation level calculation unit 120 shown in FIG. 4 to select an elementary action module whose activation level AL is highest, for example, whereby an action is outputted by the elementary action module (in step S8).

When implementing an action, the robot device will have the battery residual potential thereof varied, and the internal state calculated on the variation of the residual potential will change from that before the action implementation. Also, the internal state calculated based on the power consumption as the result of the action implementation will change from that before the action implementation. The internal-state manager 91 shown in FIG. 4 calculates such a variation of the internal state after the action implementation, and supplies the calculated variation to the learning unit 140 (in step S9). As mentioned above, the learning unit 140 calculates a new predicted internal-state variation as given by the aforementioned equations (9-1) and (9-2) or (10-1) to (10-4) from an actual variation of the internal state after completion of an action and predicted internal-state variation stored in the activation level calculation data base, and updates the activation level calculation data base (in step S10).

By providing the learning means to make learning by feeding back an actual internal-state variation to a predicted internal-state variation, the result of interaction with the environment and user can be reflected on the selection of an action.

(5) Control System in the Robot Device

Figure 18:
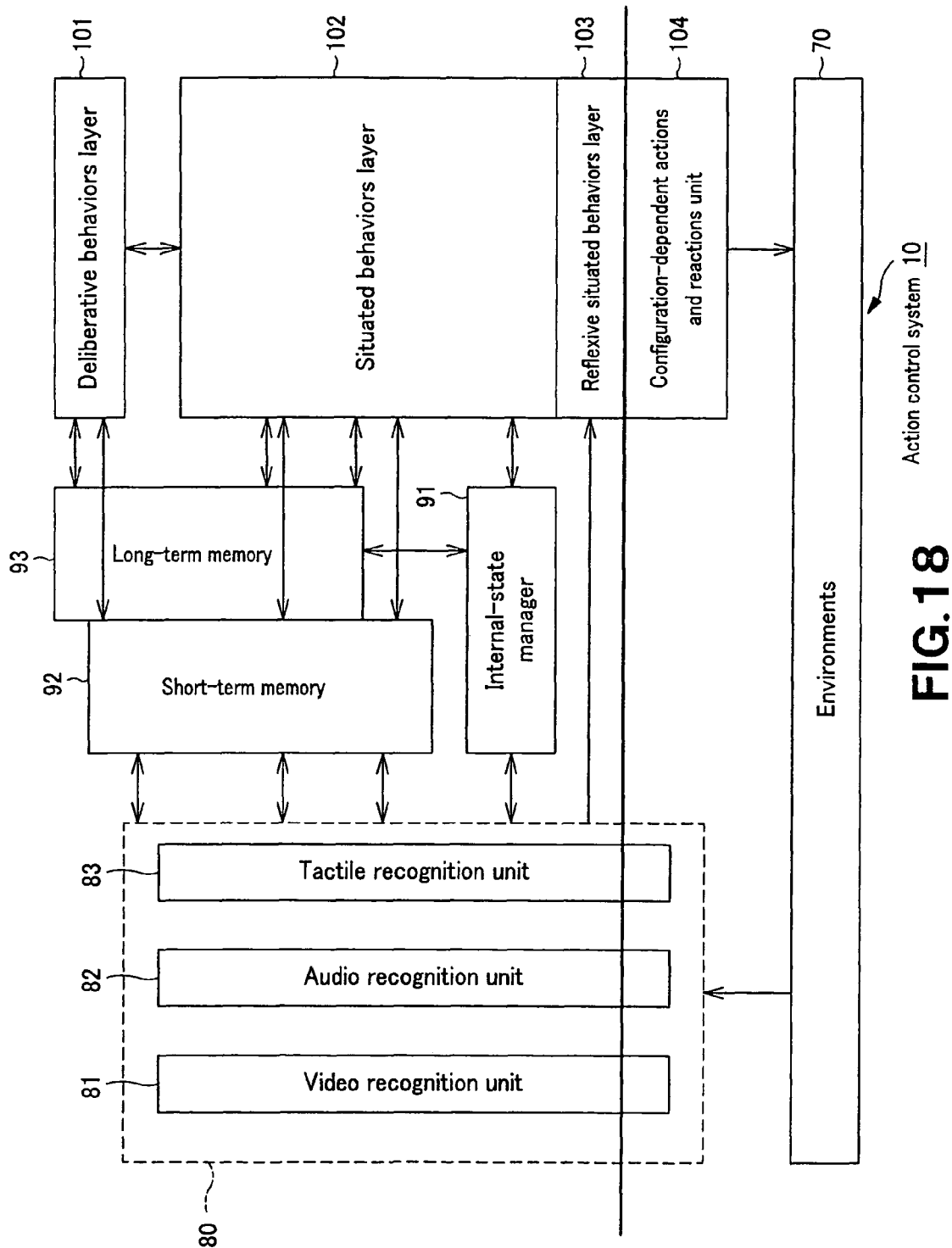
FIG. 18 is a schematic diagram of an action control system in the robot device as the embodiment of the present invention, showing functional blocks of the system.

Next, the action-selection control system to calculate the activation level AL and make an operation for outputting the selected action will be described in detail concerning a concrete example suitable as a control system for the robot device. FIG. 18 is a schematic block diagram of a control system including the aforementioned action-selection control system 100. The control system is generally indicated with a reference numeral 10. The robot device 1 as the embodiment of the present invention is designed to control the action correspondingly to the result of recognition of an external stimulus and variation of the internal state. Further, the robot device 1 includes a function of long-term storage. By storing a variation of the internal state in the long-term storage means in association with an external stimulus, the robot device 1 can control the action corresponding to the result of external-stimulus recognition and variation of the internal state.

More particularly, an activation level AL is calculated correspondingly to external stimuli including, for example, color information, shape information, face information, etc. resulted from processing of an image supplied from the camera 15 shown in FIG. 2, more specifically, color, shape, face, ordinary 3D objects, hand gesture, motion, voice, touch, smell, taste, etc. and also to an internal state indicating emotions such as instinct, sentiment, etc. based on the body of the robot device to select (generate) an action and implement the action.

The instinctive element of an internal state is at least one of fatigue, fever or temperature, pain, appetite or hunger, thirst, affection, curiosity, and elimination or sexual appetite. Also, the emotional elements include happiness, sadness, anger, surprise, disgust, fear, frustration, boredom, somnolence, gregariousness, patience, tense, relaxed, alertness, guilt, spite, loyalty, submission and jealousy.

The illustrated control system 10 can have an object-oriented programming adopted therein for installation in the robot device. In this case, each program is an object in which data and a procedure for processing the data are integrated. The object is a "module unit". Also, data can be transferred and invoked between the objects by an inter-object communication method using a message communication and shared memory.

For recognition of environments 70, the action control system 10 includes an external-stimulus recognition unit 80 in FIG. 4 as a functional module including a video recognition unit 81, audio recognition unit 82, tactile recognition unit 83, etc.

The video recognition unit 81 recognizes an image such as face, color, etc. and extracts features of the image on the basis of a captured image supplied via an image input device such as the CCD (charge-coupled device) camera, for example.

Also, the audio recognition unit 82 recognizes speech data supplied via a sound input device such as a microphone or the like to extract features of speech and recognize a word unit (text).

Further, the tactile recognition unit 83 recognizes sensor signal from a tactile sensor incorporated in the head unit of the robot device, for example, to recognize an external stimulus such as "being patted" or "being hit".

The internal-state manager (ISM) 91 manages several types of emotion such as instinct and sentiment by mathematically modeling them. It manages the internal states such as instinct and emotion of the robot device 1 correspondingly to external stimuli (ES) recognized by the aforementioned video recognition unit 81, audio recognition unit 82 and tactile recognition unit 83.

The sentiment model and instinct model (sentiment/instinct model) are supplied each with a result of recognition and action record to manage the sentiment and instinct levels, respectively. The action model can refer to these sentiment and instinct levels.

Also, for an action control corresponding to a result of external-stimulus recognition and variation of internal state, the action control system 10 includes a short-term memory (STM) 92 to store information which will be lost as the time elapses for a short term, and a long-term memory (LTM) 93 to store information for a relatively long term. The classification of an information storage mechanism into the short- and long-term storage is based on the neuropsychology.

The short-term memory 92 is a functional module to hold, for a short term, a target and event recognized in the environment by the aforementioned video recognition unit 81, audio recognition unit 82 and tactile recognition unit 83. For example, the STM 92 stores an input image from the camera 15 shown in FIG. 2 for a period as short as about 15 sec.

The long-term memory 93 is used to hold information having been acquired through learning, such as name of an object. The long-term memory 93 can store an external stimulus and internal-state variation, for example, in a certain action-stating module in association with each other.

Also, the action control over the robot device 1 is generally applied to a "reflexive situate behavior" implemented by a reflexive situated behaviors layer 103, "situated behavior" implemented by a situated behaviors layer (SBL) 102, and "deliberative behavior" implemented by a deliberative behaviors layer 101.

The reflexive situated behaviors layer 103 is a functional module to implement a reflexive situated behavior in response to an external stimulus recognized by the video recognition unit 81, audio recognition unit 82 or tactile recognition unit 83. The "reflexive situated behavior" is basically such that results of recognition of external information supplied from the sensors are directly received, sorted and an output action is directly determined. For example, behaviors such as looking after the human face, nodding, etc. should preferably be set as reflexive situated ones.

The situated behaviors layer 102 controls an action directly responsive to a current situation of the robot device 1 on the basis of the contents in the short- and long-term memories 92 and 93 and internal state managed by the internal-state manager 91.

The situated behaviors layer 102 has a state machine prepared therein for each action (elementary action), and it sorts the results of recognition of external information supplied from the sensors on the basis of previous action and situation, and implements an action of the robot device 1. Also, the situated behaviors layer 102 implements an action to keep the internal state within a certain range (also called "homeostasis behavior"). In case the internal state exceeds a specified range, the situated behaviors layer 102 will activate the action so that an action to return the internal state into the specified range can easily be implemented (actually, an action is selected with both the internal state and external stimulus being taken in consideration). The situated behavior reacts more slowly than the reflexive situated behavior. The situated behaviors layer 102 corresponds to the elementary action module 132, activation level calculation unit 120 and action selection 130 in the action-selection control system 100 shown in FIG. 4. It calculates an activation level AL from an internal state and external stimulus as having previously been described to output an action on the basis of the calculated activation level AL.

The deliberative behaviors layer 101 prepares a relatively long-term action plan for the robot device 1 on the basis of the contents in the short- and long-term memories 92 and 93. The "deliberative behavior" is a behavior which is done by deducing or planning according to a given situation or an instruction from the user. For example, searching a path according to a current position of the robot device and a target position is a deliberative behavior. Since the deduction or planning possibly needs a long time for processing and a large load of calculation as well as a reaction time for which the robot device 1 holds an interaction (shortly, they takes a long time for processing), the reflexive situate behaviors layer and situated behavior layer repeat reactions on the real-time basis, while the deliberative behaviors layer makes a deduction or planning.

The deliberative behaviors layer 101, situated behaviors layer (SBL) 102 and reflexive situated behaviors layer 103 can be stated as superordinate application programs independent of the hardware of the robot device 1. On the other hand, a configuration-dependent actions and reactions unit 104 controls directly the hardware (environments) of the robot device 1 such as the joint actuators according to such superordinate application programs, that is, an instruction from an action-stating module (schema). With this configuration, the robot device 1 can judges its internal state and surroundings on the basis of a control program and autonomously act in response to a user's instruction or action on the robot device 1.

Next, the action control system 10 will be described in further detail with reference to FIG. 19 which is a schematic diagram showing objects of the action control system 10 as the embodiment of the present invention.

Figure 19:
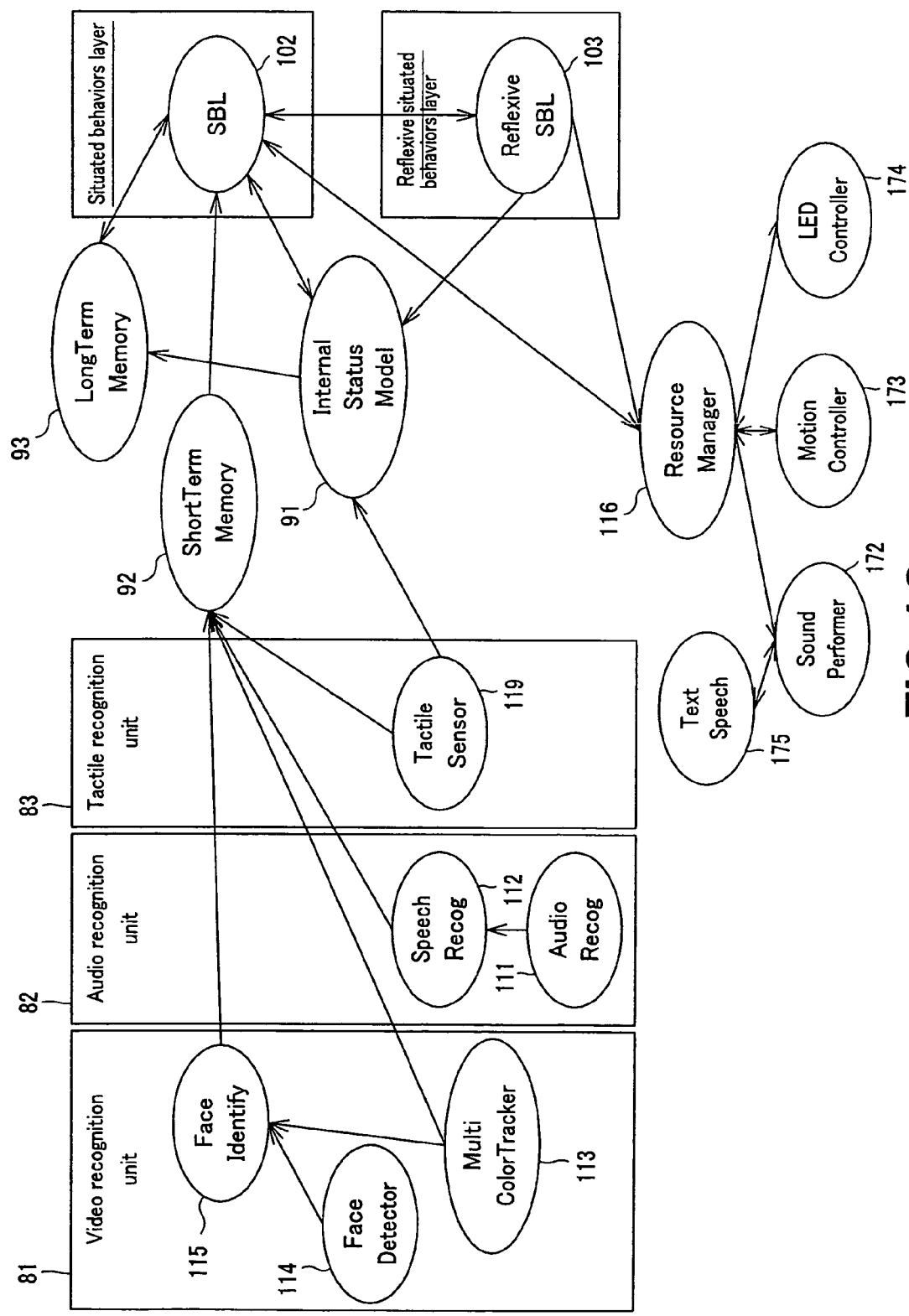
FIG. 19 is also a schematic diagram of the action control system in the robot device as the embodiment of the present invention, showing objects of the system.

As shown in FIG. 19, the video recognition unit 81 includes three objects, namely, a face detector 114, multi-color tracker 113 and face identify unit 115.

The face detector 114 is an object to detect the face area in an image frame and supply the result of detection to the face identify unit 115. The multi-color tracker 113 is an object to recognize colors and supply the result of recognition to the face identify unit 115 and short-term memory (STM) 92. The face identify unit 115 identifies who the person is by searching an on-hand persons dictionary for the face image of the person, and outputs ID information on the person along with information on the position and size of the face image area to the STM 92.

The audio recognition unit 82 includes two objects, an "Audio Recog" unit 111 and "Speech Recog" unit 112. The "Audio Recog" unit 111 is an object which is supplied with speech data from the sound input unit such as a microphone, and extracts features and detects a speech section. It supplies the features of the speech data in the speech section and direction of sound source to the "Speech Recog" unit 112 and STM 92. The "Speech Recog" unit 112 is an object which make speech recognition on the basis of the features of the speech supplied from the "Audio Recog" unit 111, speeches dictionary and syntax dictionary. It supplies a set of recognized words to the STM 92.

The tactile recognition unit 83 is formed from a tactile sensor 119 as an object to recognize a sensor input from the tactile sensor. It supplies the result of recognition to the STM 92 and an internal-state model (ISM) 91 which is an object to manage the internal state.

The STM 92 is an object included in the short-term memory, and it is also a functional module which holds, for a short term, a target or event recognized by each of the recognition objects from the environments (namely, it holds an input image from the camera 15, for example, for a short term of about 15 sec). The STM 92 periodically notifies the SBL 102 as an STM client of an external stimulus.

The LTM 93 is an object included in the log-term memory, and used to hold information acquired through the learning, such as the name of an object for a long term. The LTM 93 can store an external stimulus and internal-state variation in association with each other in the action-stating module (schema), for example.

The ISM 91 is an object included in the internal-state manager. It manages several types of emotion such as instinct and sentiment formed in a mathematical model. More specifically, it manages internal states such as the instinct and emotion of the robot device 1 correspondingly to an external stimulus ES recognized by each of the recognition objects.

The SBL 102 is an object included in the situated behaviors layer. The SBL 102 is also an object as a client of the STM 92 (STM client). Upon periodical notification of information on external stimuli (target and event) from the STM 92, the SBL 102 determines a schema, namely, an action-stating module to be executed (will be described in detail later).

The reflexive SBL (reflexive situated behaviors layer) 103 is an object included in the reflexive situated behaviors layer. It implements a reflexive or direct robot motion in response to an external stimulus recognized by each of the aforementioned recognition objects. For example, it makes a behavior such as looking after the human face, nodding or detection of an obstacle with prompt avoiding of the obstacle.

The SBL 102 selects a motion corresponding to a situation such as an external stimulus or internal-state variation. On the other hand, the reflexive SBL 103 selects a reflexive motion in response to an external stimulus. Since each of these objects selects an action independently of each other, in case it has the robot device 1 execute a selected action-stating module (schema), conflict of the hardware resource of the robot device 1 with them will possibly make it impossible to make such an action selection as the case may be. The RM (resource manager) 116 as an object arbitrates hardware conflict during action selection by the SBL 102 and reflexive SBL 103. Each of the modules which do a robot motion on the basis of the result of arbitration is notified of the result of arbitration and thus the robot device is put into action.

There are also provided a sound performer 172, motion controller 173 and LED controller 174, all being objects to implement a robot motion. The sound performance 172 is an object to output a speech or voice. It synthesizes a sound correspondingly to a text or command supplied from the SBL 102 via the RM 116 and delivers the sound at the speaker in the robot body. The motion controller 173 is an object to operate each joint actuator of the robot body. In response to a command supplied from the RML 102 via the RM 116 to move the hand, leg or the like, the motion controller 173 calculates an angle of a joint in consideration. The LED controller 174 is an object to have the LED flicker. In response to a command received from the SBL 102 via the RM 116, the LED controller 174 controls the LED 19 to flicker.

(5-1) Controlling the Situated Behavior

Figure 20:
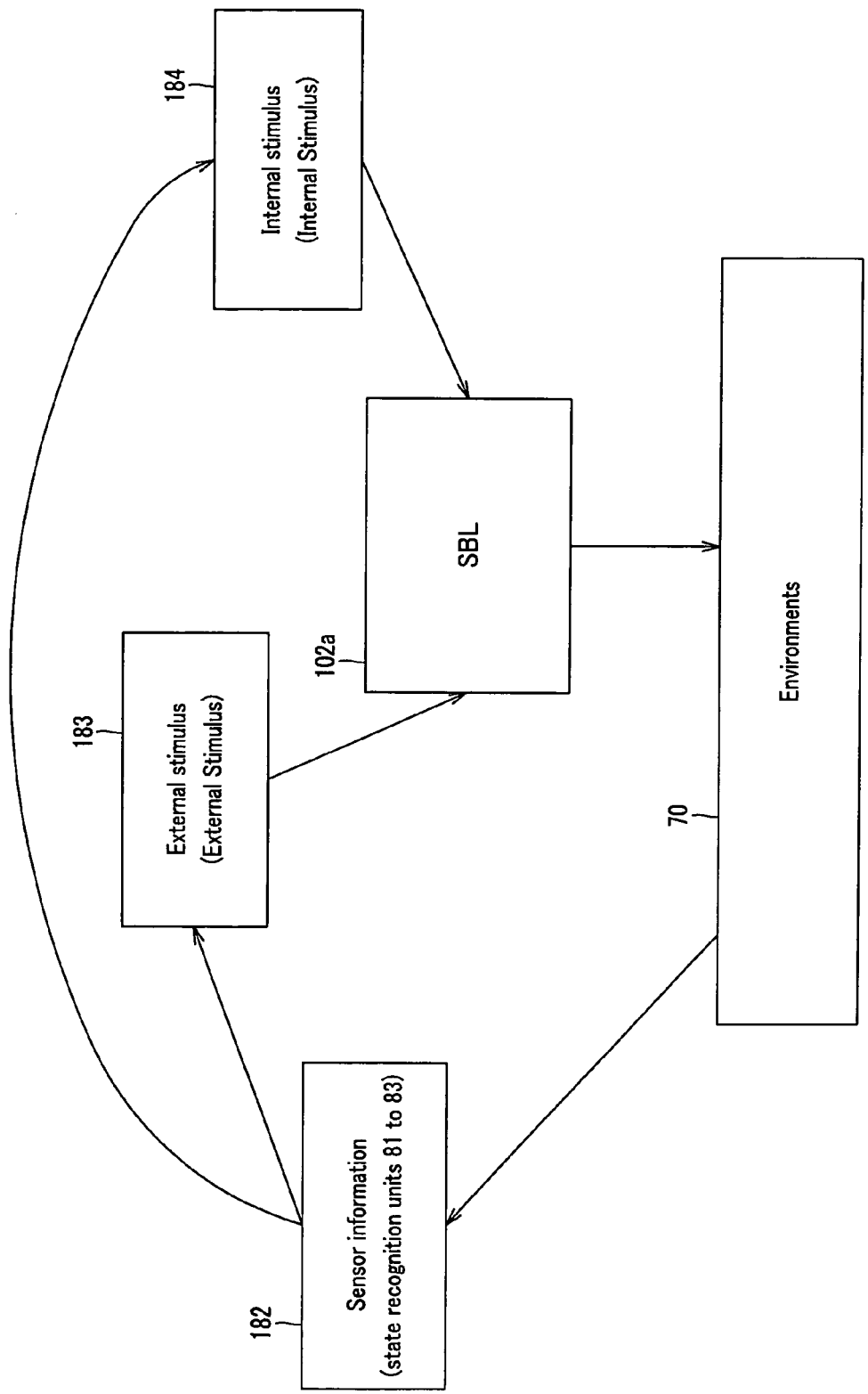
FIG. 20 is a schematic diagram of a situated-behavior control by a situated behaviors layer in the robot device as the embodiment of the present invention.

The situated behaviors layer which calculates an activation level AL to select an action to be implemented has once been described in the foregoing, but it will be described in further detail herebelow. FIG. 20 is a schematic diagram of the situated-behavior control by the situated behaviors layer (SBL) which however includes the reflexive situated behaviors layer). The result of recognition of the environments 70 (sensor information 182) by the external-stimulus recognition unit 80 including the video recognition unit 81, audio recognition unit 82 and tactile recognition unit 83 is supplied as an external stimulus 183 to a situated behaviors layer (including the reflexive situated behaviors layer 103) 102a. An internal-state variation 184 corresponding to the result of recognition of the environments 70 by the external-stimulus recognition unit 80 is also supplied to the situated behaviors layer 102a. The situated behaviors layer 102a can judge the situation on the basis of the external stimulus 183 and internal-state variation 184 to select an action. The situated behaviors 102a calculates an activation level AL of each action-stating module (schema) on the basis of the external stimulus 183 and internal-state variation 184 as above to select a schema correspondingly to the magnitude of the activation level AL, and implement an action (motion). For calculation of the activation level AL, it is possible to make uniform calculation for all the schemata by using a library, for example. The library reserves a function for calculation of an instinct vector from an internal-state vector, function for calculation of a satisfaction-level vector from the internal-state vector, action evaluation data base for prediction of a predicted internal-state variation vector from an external stimulus, etc.

(5-2) Schema

Figure 21:
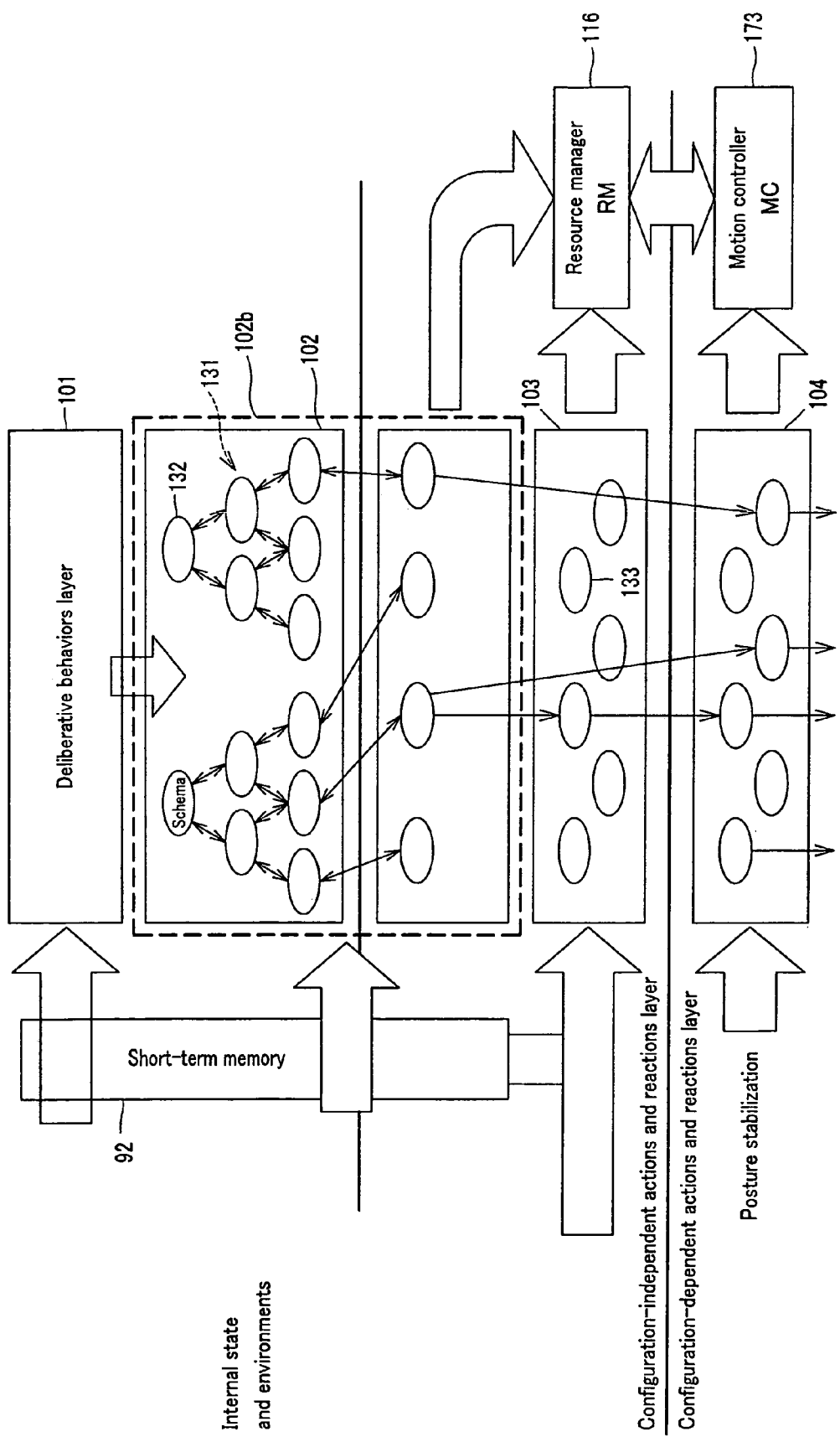
FIG. 21 is a schematic diagram of the situated behaviors layer comprised of a plurality of schemata.

FIG. 21 schematically illustrates the situated behaviors layer 102 comprised of a plurality of schemata 132. The situated behaviors layer 102 has an action-stating module as the aforementioned elementary action, has a state machine prepared therein for each of the action-stating modules, sorts the result of recognition of external information supplied from each sensor on the basis of a preceding action (motion) and situation, and thus has the robot make a motion. The action-stating module as an elementary action is stated as a schema 132 having a "Monitor" function to judge the situation on the basis of an external stimulus and internal state, and an "Action" function to implement a state machine incidental to implementation of an action.

There is provided a situated behaviors layer 102b (strictly speaking, a layer included in the situated behaviors layer 102 to control an ordinary situated behavior) is formed from a plurality of schemata 132 hierarchically connected to each other in the form of a tree structure. It comprehensively judges an optimum schema 132 on the basis of an external stimulus and internal state to control action. The tree 131 includes a plurality of sub trees (branches) formed from an action model generated by mathematical modeling of ethological situated behaviors, sub trees for expressing a sentiment, etc.

Figure 22:
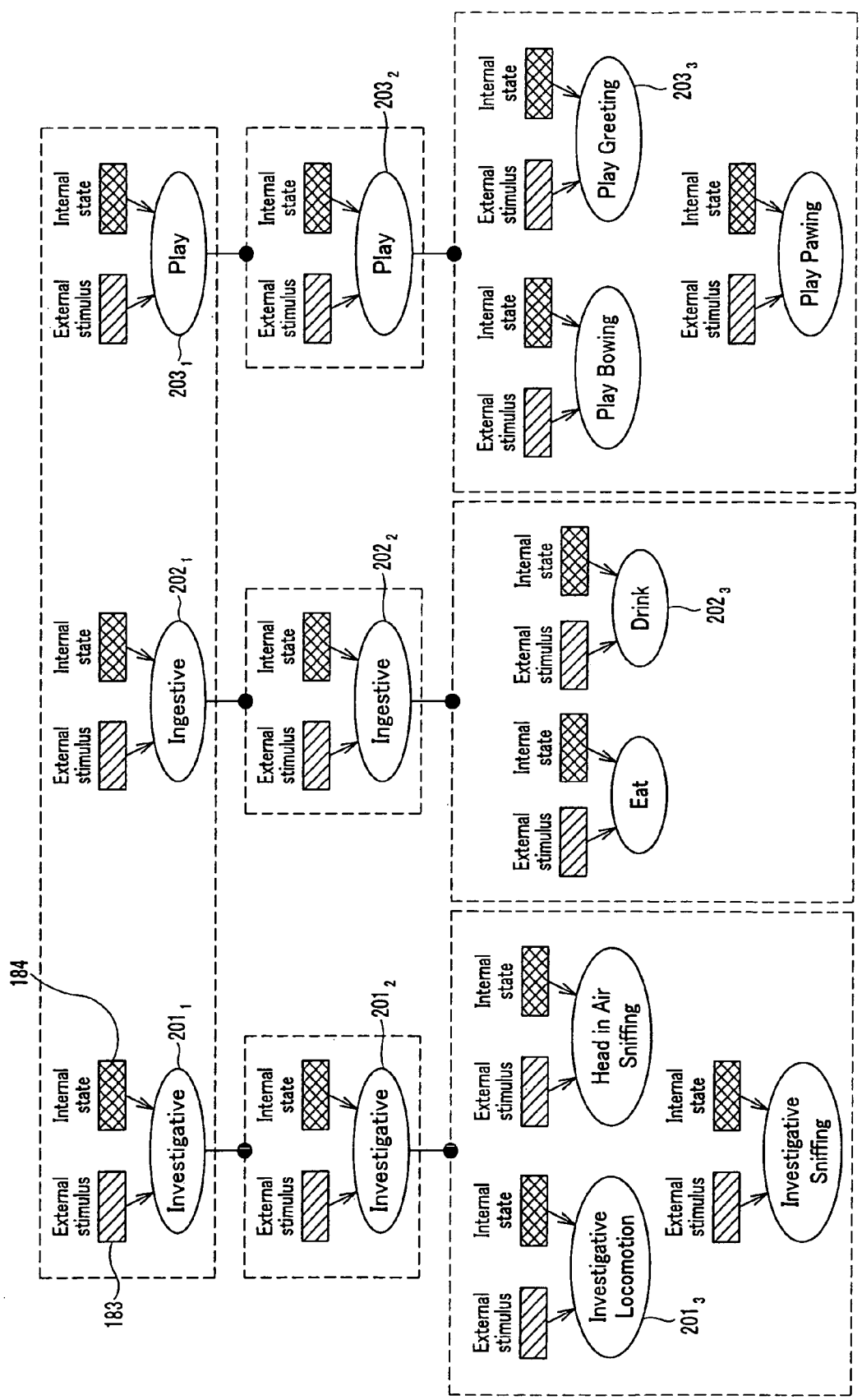
FIG. 22 is a schematic diagram of a tree configuration of the schemata in the situated behaviors layer.

FIG. 22 schematically illustrates the tree configuration of the schemata in the situated behaviors layer 102. As shown, the situated behaviors layer 102 has disposed therein schemata in each layer in a direction from an abstract action category toward a concrete action category. Of the schemata, root schemata $201_1$, $202_1$ and $203_1$ notified of an external stimulus from the short-term memory 92 are disposed in the first layer. For example, in a layer directly below the root schemata, there are disposed schemata $201_2$, $202_2$ and $203_2$ for "Investigate", "Ingestive" and "Play", respectively. Further, below the "Investigate" schema $201_2$, there is disposed a plurality of schemata $201_3$ for "Investigative Locomotion", "Head in Air Sniffing" and "Investigative Sniffing" each having a more concrete investigative action stated therein. Similarly, below the "Ingestive" schema $202_2$, there is disposed a plurality of schemata $202_3$ for "Eat" and "Drink" each having a more concrete ingestive action stated therein. Also, below the "Play" schema $203_2$, there is disposed a plurality of schemata $203_3$ for "Play Bowing", "Play Greeting" and "Play Pawing" each having a more concrete playing action.

As shown, each of the schemata is supplied with the external stimulus 183 and internal state (variation) 184. Also, each schema has at least the "Monitor" function and "Action" function.

The "Monitor" function is to calculate an activation level AL of a schema in consideration on the basis of the external stimulus 183 and internal state 184. Each schema has the "Monitor" function as an activation level calculation means. In the tree configuration as shown in FIG. 22, the superordinate (parent) schema can call the "Monitor" function of a subordinate (child) schema by taking the external stimulus 183 and internal state 184 as arguments, and the child schema takes the activation level AL as a return value. Also, the schema can call the "Monitor" function of the child schema in order to calculate its own activation level AL. Since an activation level AL is returned from each sub tree to each root schema, the root schema can comprehensively judge an optimum schema for the external stimulus and internal-state change, that is, an action. Note here that the activation level AL of each schema may of course be observed by the resource manager (RM) 116 and a separately provided action selector, which will be described in detail later), and an action be selected based on the value of each activation level AL.

The action selection may be adapted to select a schema whose activation level AL is highest, for example, or to select more than two schemata whose activation level AL is higher than a predetermined threshold for parallel performance (in this case, however, there should be no conflict concerning the hardware resource between the schemata).

The "Action" function has a state machine having stated therein an action the schema itself has. In the tree configuration shown in FIG. 22, the parent schema can call the "Action" schema and start or interrupt the performance of a child schema. In this embodiment, the state machine of the "Action" function is not initialized before it gets ready. In other words, even when the schema performance is interrupted, the state will not be reset. Since the schema stores work data collected during the performance, it can be performed and interrupted.

Figure 23:
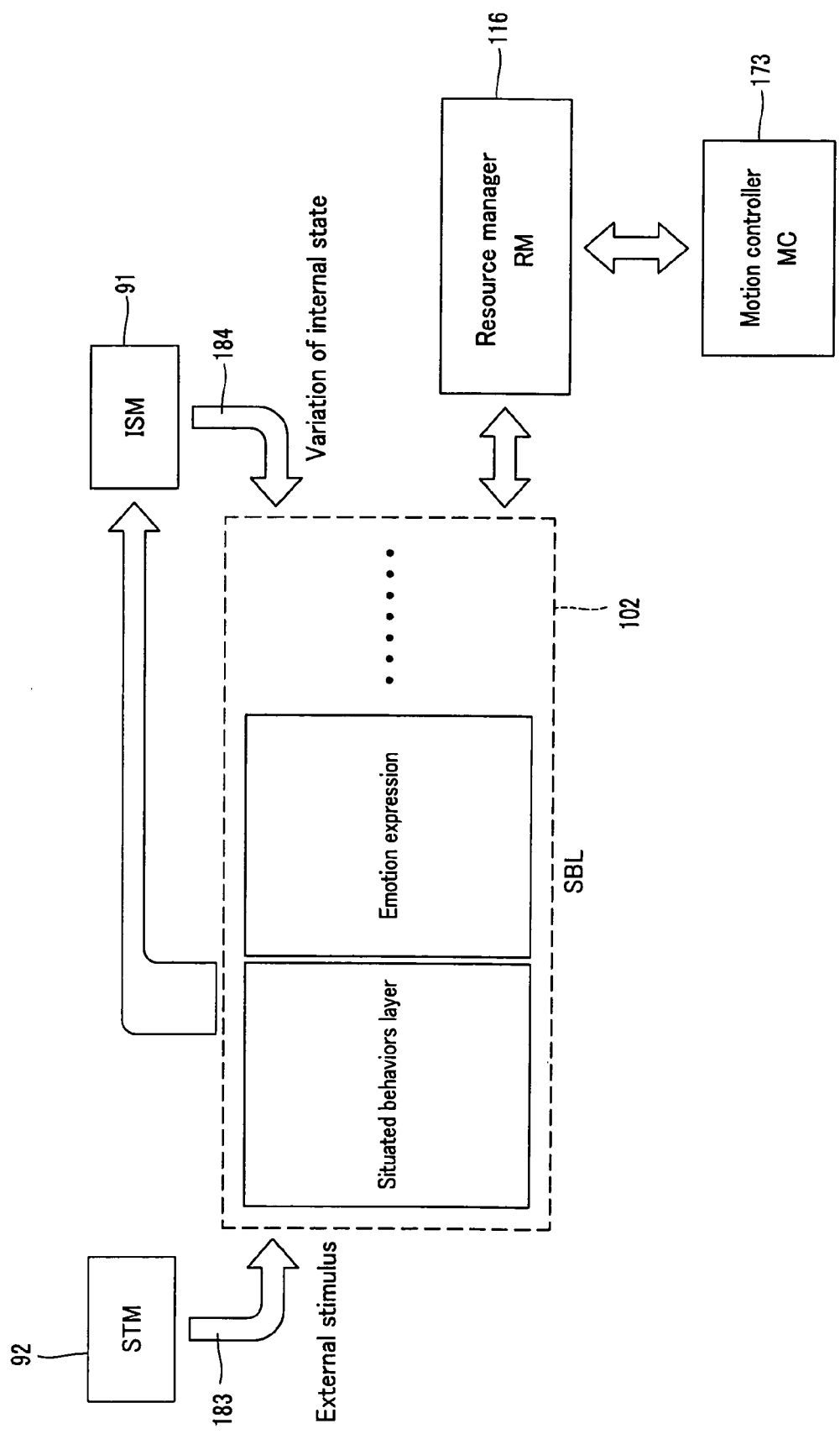
FIG. 23 is a schematic diagram of a mechanism for controlling normal situated behaviors in the situated behaviors layer.

FIG. 23 schematically illustrates a mechanism for controlling normal situated behaviors in the situated behaviors layer 102.

As shown in FIG. 23, the situated behaviors layer 102 is notified of the external stimulus 183 from the short-term memory (STM) 92 while being supplied with the internal-state change 184 from the internal-state manager 91. The situated behaviors layer 102 includes a plurality of sub trees such as an action model formed by mathematization of ethological situated behaviors, sub trees to express an emotion, etc. In response to the notification of the external stimulus 183, the root schema calls the "Monitor" function of each sub tree, comprehensively makes an action selection by referring to the activation level AL as a return value, and calls the "Action" function for a sub tree which implements a selected action. Also, the situated behavior determined in the situated behaviors layer 102 is applied to the motion controller after arbitration by the resource manager (RM) 116 of a conflict between the situated behavior and reflexive situated behavior in the reflexive situated behaviors layer 103.

Also, the reflexive situated behaviors layer 103 makes a reflexive or direct motion control in response to the external stimulus 183 recognized by each of the recognition objections, for example, by detection of an obstacle with prompt avoiding of the obstacle. Thus, different from the disposition of the schemata for control of normal situated behavior as shown in FIG. 22, a plurality of schemata 133 supplied directly with a signal from each recognition object is disposed in parallel with each other not in any hierarchy as shown in FIG. 21.

Figure 24:
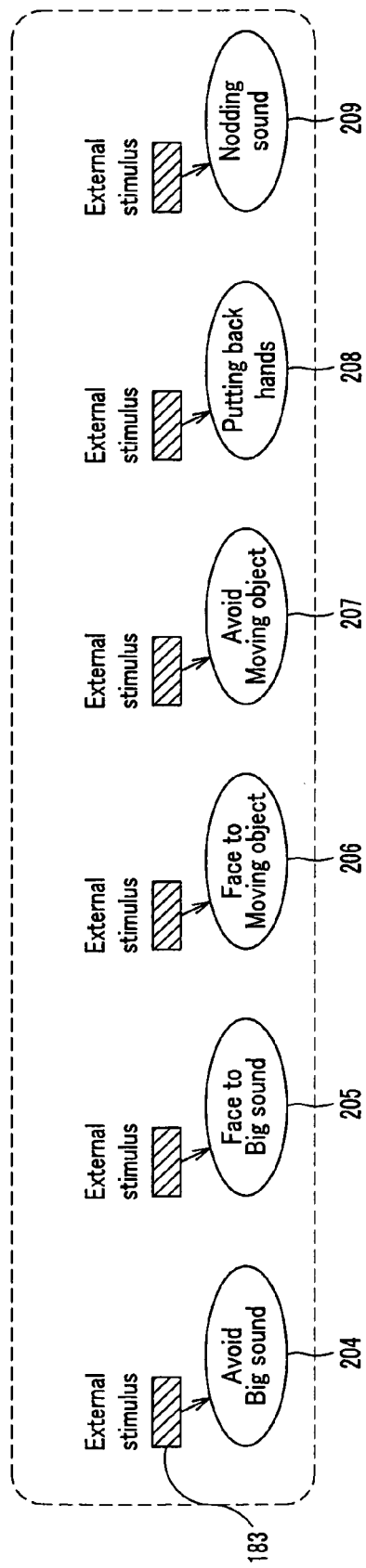
FIG. 24 is a schematic diagram of a reflexive situated behaviors layer comprised of a plurality of schemata.

FIG. 24 schematically illustrates the configuration of schemata in the reflexive situated behaviors layer 103. As shown, the reflexive situated behaviors layer 103 has disposed in parallel therein schemata "Avoid Big sound" 204, "Fate to Big sound" 205 and "Nodding sound" 209 which are operative in response to the result of recognition by the audio system, schemata "Face to Moving object" 206 and "Avoid Moving object" 207 which are operative in response to the result of recognition by the video system, and a schema "Putting Back Hands" 208 which is operative in response to the result of recognition by the tactile system.

As shown, each of the schemata making the reflexive behaviors is supplied with the external stimulus 183. Each schema has at least the "Monitor" function and "Action" function. The "Monitor" function is to calculate an activation level AL of the schema correspondingly to the external stimulus 183 to judge whether a reflexive situated behavior corresponding to the calculated activation level AL should be made or not. The "Action" function has a state machine (will be described in detail later) having stated therein a reflexive situated behavior the schema itself has. When called, the "Action" function will implement the reflexive situated behavior and shift the "Action" state.

Figure 25:
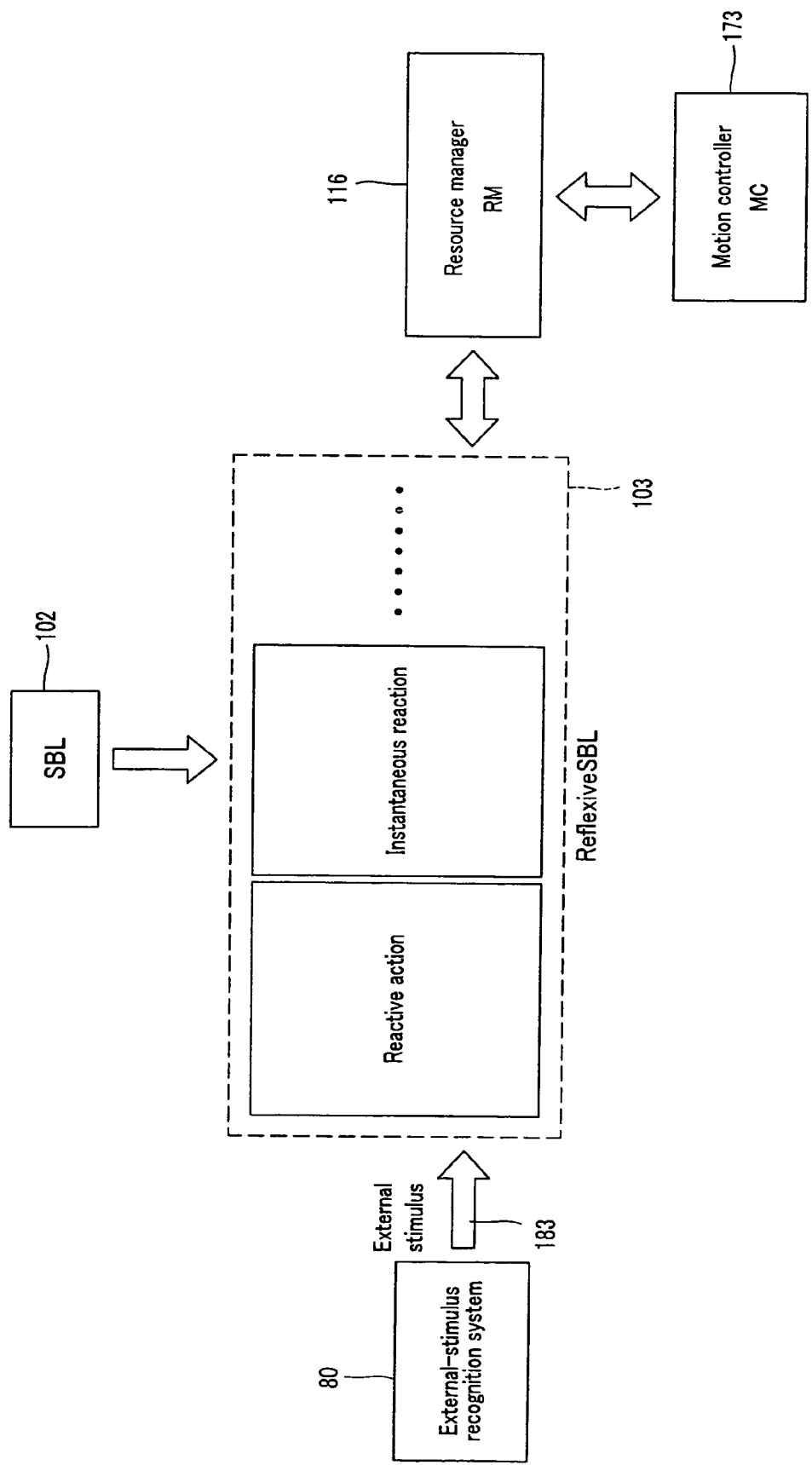
FIG. 25 is a schematic diagram of a mechanism for controlling a reflexive situated behavior by a reflexive situated behaviors layer.

FIG. 25 schematically illustrates a mechanism for controlling the reflexive situated behavior in the reflexive situated behaviors layer 103. As shown in FIG. 24 as well, the reflexive situated behaviors layer 103 has disposed in parallel therein the schemata stating reactive behaviors and schemata stating instantaneous responsive behaviors. When supplied with the result of recognition from each of the objects included in the recognition module 80, a corresponding reflexive situated behavior schema will calculate an activation level AL by the "Action" function, and judge whether it should start an action in consideration correspondingly to the AL value. The reflexive situated behavior determined to be started by the reflexive situated behaviors layer 103 is applied to the motion controller (MC) 173 after the resource manager (RM) 116 arbitrates a conflict as to the hardware resource between the reflexive situated behavior and situated behavior by the situated behaviors layer 102.

Figure 26:
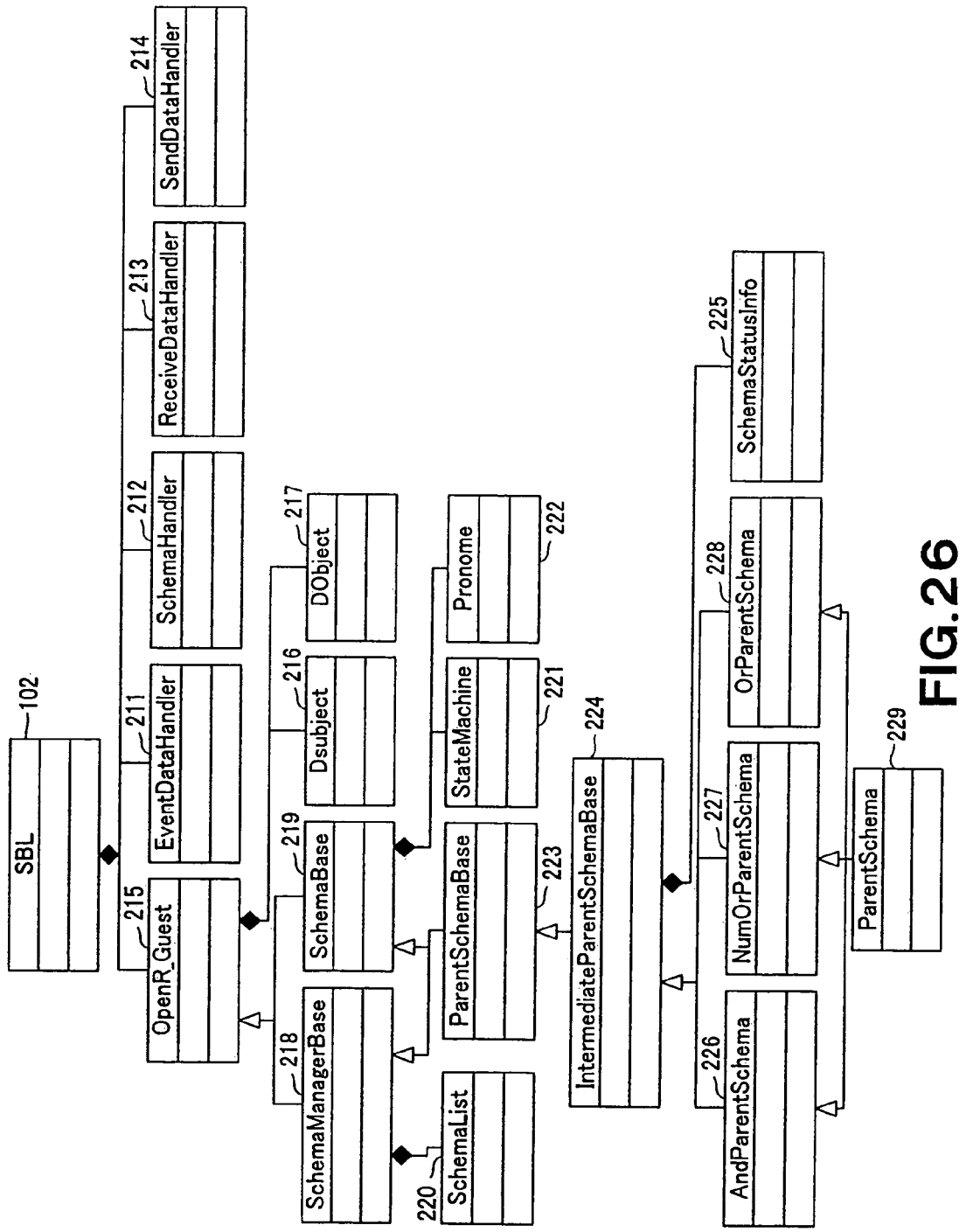
FIG. 26 is a schematic diagram showing the class definition of schemata used in the situated behaviors layer.

The schemata included in the situated behaviors layer 102 and reflexive situated behaviors layer 103 can be stated as "class object" which is stated in the "C++" language. FIG. 26 schematically illustrates the class definition of a schema used in the situated behaviors layer 102. Each of blocks shown in FIG. 26 is equivalent to one class object.

As shown, the situated behaviors layer (SBL) 102 includes more than one schema, an Event Data Handler (EDH) 211 to assign an ID to an input or output event of the SBL 102, Schema Handler (SH) 212 to manage the schemata in the SBL 102, more than one Receive Data Handler (RDH) 213 to receive data from an external object (STM, LTM, RM, each recognition object or the like), and more than one Send Data Handler (SDH) 214 to send data to the external object.

The schema handler 212 saves, as a file, information such as schema included in the situated behaviors layer (SBL) 102 and reflexive situated behaviors layer 103, tree configuration, etc. For example, after the system is initially started, the schema handler 212 reads the configuration information file to reconstruct the schema configuration in the situated behaviors layer 102 as shown in FIG. 22 and map the entity of each schema in the memory space.

Each schema includes an OpenR_Guest 215 positioned as the base for the schema. The OpenR_Guest 215 includes, as class objects, more than one Dsubject 216 by which the schema sends data to outside and more than one DObject 217 by which the schema receives data from outside. For example, when the schema sends data to an external object (STM, LTM, each recognition object or the like) of the SBL 102, the Dsubject 216 writes sent data into the Send Data Handler 214. Also, the DObject 217 can read, from the Receive Data Handler 213, data received from an external object of the SBL 102.

A Schema Manager 218 and Schema Base 219 are also provided. They are both a class object inheriting the OpenR_Guest 215. The "class inheritance" is to inherit the definition of an original class. In this case, it is meant that the Schema Manager 218 and Schema Base 219 also include the class objects such as the Dsubject 216, DObject 217, etc. defined in the OpenR_Guest 215 (which is also true in the following). For example, in the tree configuration of the plurality of schemata as in FIG. 22, the Schema Manager 218 has a class object "Schema List" 220 which manages the list of child schemata (that is, it has a pointer to the child schema) and thus can call the function of a child schema. Also, the schema base 219 has a pointer to the parent schema, and thus can return the return value of the called function from the parent schema.

The Schema Base 219 has two class objects, namely, a State Machine 221 and Pronome 222. The State Machine 221 manages the state machine concerning the action of the schema ("Action" function). The parent schema can select a state machine of the "Action" function of the child schema (shifts the state). The Pronome 222 substitutes a target for or to which the schema in consideration is performed or applies an action ("Action" function). As will be described later, the schema is occupied by a target placed in the Pronome 222 and will not be liberated until the action (or motion) is completed (successfully or not successfully). For doing the same action for a new target, a schema defined in the same class is generated in the memory space. As a result, the same schema can be performed independently for each target (with no interference between work data of the individual schemata), and the re-entrability of the action which will be described in detail later will be assured.

A Parent Schema Base 223 is also provided. This is a class object inheriting both the Schema Manager 218 and Schema Base 219. In the tree configuration of the schemata, the Parent Schema Base 223 manages the relation between schemata themselves each as a parent schema and child schema, namely, the parent-child relation between the schemata.

An Intermediate Parent Schema Base 224 is also provided. It is a class object inheriting the Parent Schema Base 223, and implements interface conversion for each class. Also, the Intermediate Parent Schema Base 224 has a Schema Status Info 225. The Schema Status Info 225 is a class object to manage the state machine of the schema itself. The parent schema can select a state of the state machine by calling the "Action" function of the child schema. Also, the parent schema can call the "Monitor" function of the child schema and inquire an activation AL corresponding to the normal state of the state machine. However, it should be noted that the state machine of the schema is different from that of the aforementioned "Action" function.

An And Patent Schema 226, Num Or Patent Schema 227 and Or Parent Schema 228 are also provided. They are class objects inheriting the Intermediate Patent Schema Base 224. The And Parent Schema 226 has a point to a plurality of child schemata to be performed simultaneously. The Or Parent Schema 228 has a point to a plurality of child schemata to be selectively performed. Also, the Num Or Parent Schema 227 has a point to a plurality of child schemata of which a predetermine part is to be performed simultaneously.

A Parent Schema 229 is also provided which is a class object inheriting all the above And Parent Schema 226, Num Or Parent Schema 227 and Or Parent Schema 228.

Figure 27:
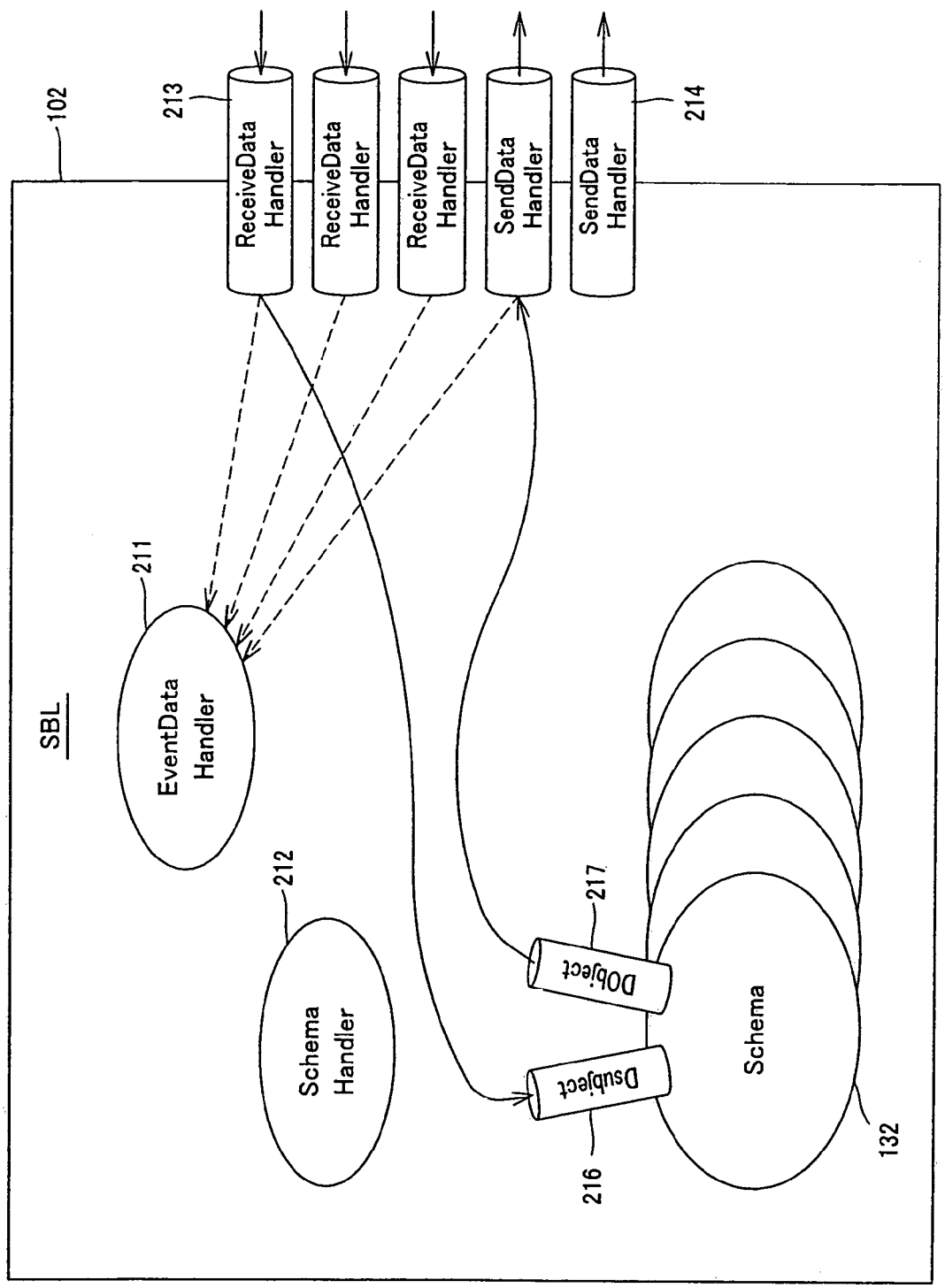
FIG. 27 is a schematic diagram showing functions of the classes in the situated behaviors layer.

FIG. 27 schematically illustrates the functions of the classes in the situated behaviors layer (SBL) 102. The situated behaviors layer (SBL) 102 includes more than one Receive Data Handler (RDH) 213 to receive data from STM, LTM, an external object such as each recognition object, and more than one Send Data Handler (SDH) 214 to send data to an external object.

The Event Data Handler (EDH) 211 is a class object to assign ID to an input or output event of the SBL 102. It is notified of an input or output event from the RDH 213 and SDH 214.

The Schema Handler 212 is a class object to manage the schemata. It saves, as a file, information on the configuration of the schemata included in the SBL 102. For example, after the system is initially started, the Schema Handler 212 reads the configuration information file to reconstruct the schema configuration in the situated behaviors layer (SBL) 102.

Each schema is generated according to the class definition shown in FIG. 26 and its entity is mapped in the memory space. Each of the schemata takes the OpenR_Guest 215 as a base class object, and has class objects such as the DSubject 216, DObject 217, etc. for access to external data.

Main functions and state machines the schema has are listed below. The following functions are stated in the Schema Base 219.

Activation Monitor ( ):
Performance function to activate the schema when ready
Actions ( ):
State machine for performing an action when active
Goal ( ):
Function for evaluating whether the schema has reached the goal when active
Fail ( ):
Function for judging whether the schema is in failure when active
Sleep Actions ( ):
State machine to be executed before in sleep
Sleep Monitor ( ):
Performance function to resume an action when in sleep
Resume Actions ( ):
State machine to resume an action before resumed
Destroy Monitor ( ):
Performance function to judge whether the schema is in failure when in sleep
Make Pronome ( ):
Function to determine a target of the tree as a whole (5-3) Functions of the Situated Behaviors Layer The situated behaviors layer (SBL) 102 controls an action conforming to a current situation of the robot device 1 on the basis of the contents of the short- and long-term memories 92 and 93 and internal state managed by the internal-state manager 91.

As having been described in (5-2), the situated behaviors layer 102 in this embodiment is formed from the tree of schemata (see FIG. 22). The schemata know their own parents and children and are independent of each other. Because of this schemata tree configuration, the situated behaviors layer 102 has main features: concurrent evaluation, concurrent performance, preemption and re-entrability. Each of these features will be explained below.

(5-3-1) Concurrent Evaluation

As having previously been mentioned, the schema as an action-stating module has the "Monitor" function to judge the situation on the basis of an external stimulus and internal-state variation. The "Monitor" function is installed because the schema has the "Monitor" function in the class object Schema Base. The "Monitor" function is to calculate an activation level AL of the schema itself on the basis of an external stimulus and internal state.

In the tree configuration shown in FIG. 22, the superordinate (parent) schema can call the "Monitor" function of its subordinate (child) schema with the external stimulus and internal-state variation being taken as arguments, while the child schema takes the activation level AL as a return value. Also, the schema can call the "Monitor function" of its child schema in order to calculate its own activation level AL. Since the activation level AL is returned from each sub tree to the schemata $201_1$ to $203_1$ on the route, it is possible to comprehensively judge an optimum schema, namely, an action, corresponding to the external stimulus 183 and internal-state variation 184.

Because of the above-mentioned tree configuration, the schemata are evaluated based on the external stimulus 183 and internal-state variation 184 concurrently in a direction from the bottom toward top of the tree configuration. More specifically, in case a schema has child schemata, it will call first the "Monitor" function of a selected one of its child schemata, and then executes its own "Monitor" function. Next, the schema will pass a performance permission as the result of evaluation in a direction from the top toward bottom of the tree function. The evaluation and execution are effected while a conflict between resources used in this operation is being settled.

The situated behaviors layer 102 in this embodiment is adaptable to situations such as the external stimulus 183 and internal-state variation 184 because the actions can be evaluated using the tree configuration of schemata. Also, since the entire tree configuration can be evaluated during the evaluation and the tree is varied based on an activation level AL calculated in the evaluation, the schema, that is, an action to be performed, can be prioritized.

(5-3-2) Current Execution

Since an activation level AL is returned from each sub tree to the schemata on the route, it is possible to judge the optimum schema, namely, action, corresponding to the external stimulus 183 and internal-state variation 184 in an integrative manner. For example, a schema whose activation level AL is highest may be selected or more than two schemata whose activation level AL is higher than a predetermined threshold may be selected for parallel performance (in this case, however, there should be no conflict concerning the hardware resource between the schemata).

A schema thus selected and given the performance permission is performed. That is, the schema observes the external stimulus 183 and internal-state variation 184 in further detail and performs a command. The schemata are performed one after another, namely, concurrently in a direction from the top toward bottom of the tree configuration. That is, in case the schema has child schemata, the "Action" function of the child schema is executed.

The "Action" function has a state machine having stated therein an action (motion) of the schema itself. In the tree configuration shown in FIG. 22, the parent schema can call the "Action" function to start or abort the performance of its child schema.

Because of the tree of schemata, in case no conflict exists between the resources, the situated behaviors layer (ABL) 102 in this embodiment can perform another schema which uses an excessive resource. However, it should be noted that unless resources used up to a goal are limited, an inconsistent action will possibly take place. A situated behavior determined in the situated behaviors layer 102 is applied to the motion controller after arbitration by the resource manager of a conflict in hardware resource between the situated behavior and reflexive situated behavior by the reflexive situated behaviors layer (reflexive SBL) 103.

(5-3-3) Preemption

If there exists a schema more important (of a higher priority) than a schema once performed, the latter schema has to be aborted and the right of performance has to be passed to the more important schema. Also, when a more important action has been completed (successfully or not successfully), it is also necessary to resume the original schema for continuous performance.

The performance of schemata according to their priority is similar to the function, called "Preemption", of the operation system (OS) for the computers. In the OS, tasks of higher priority are carried out as timed with their schedules being taken in consideration.

On the other hand, since the control system 10 of the robot device 1 according to this embodiment covers a plurality of objects, arbitration has be made between the objects. For example, the reflexive situated behaviors layer 103 as an object to control a reflexive situated behavior has to avoid an obstacle or achieve a balance without any care of the behavior evaluation of the situated behaviors layer 102 as an object to control a superordinate situated behavior. Actually, the reflexive situated behaviors layer 103 deprives the situated behaviors layer 102 of the right of performance for performance of a reflexive situated behavior. Being noticed of the deprival, the superordinate action-stating module (SBL) will keep a preemptive ability by settling the deprival.

It is assumed here that in the situated behaviors layer 102, a performance permission has been given to a schema as the result of evaluation of the activation level AL, made based on the external stimulus 183 and internal-state variation 184. Also it is assumed that another schema has become of a higher importance as the result of evaluation of the activation level AL, made based on the subsequent external stimulus 183 and internal-state variation 184. In such a case, another preemptive action is selected by selecting the sleep state with the use of the "Action" function of a schema being performed to abort the schema.

The "Actions ( )" state of the schema being performed is reserved and "Actions ( )" of another schema is performed. Also, after completion of "Actions ( )" of the other schema, the "Actions ( )" of the schema having been aborted can be performed again.

Also, the "Actions ( )" of a schema being performed is aborted, and "Sleep Actions ( )" is performed before the right of performance is passed to another schema. For example, when finding a soccer ball during interaction, the robot device 1 can play soccer with saying "Wait a moment".

(5-3-4) Re-Entrability

Each of the schemata included in the situated behaviors layer 102 is a kind of rub routine. When called from a plurality of parents, the schema has a memory space for the parents for storing its internal state.

The re-entrability is similar to that in the field of computers, the OS (operating system). It will be referred to as "schema re-entrability" herein. As shown in FIG. 27, a schema is comprised of class objects, and the re-entrability is implemented by generating the entity, that is, instance, of a class object for each target (Pronome).

Figure 28:
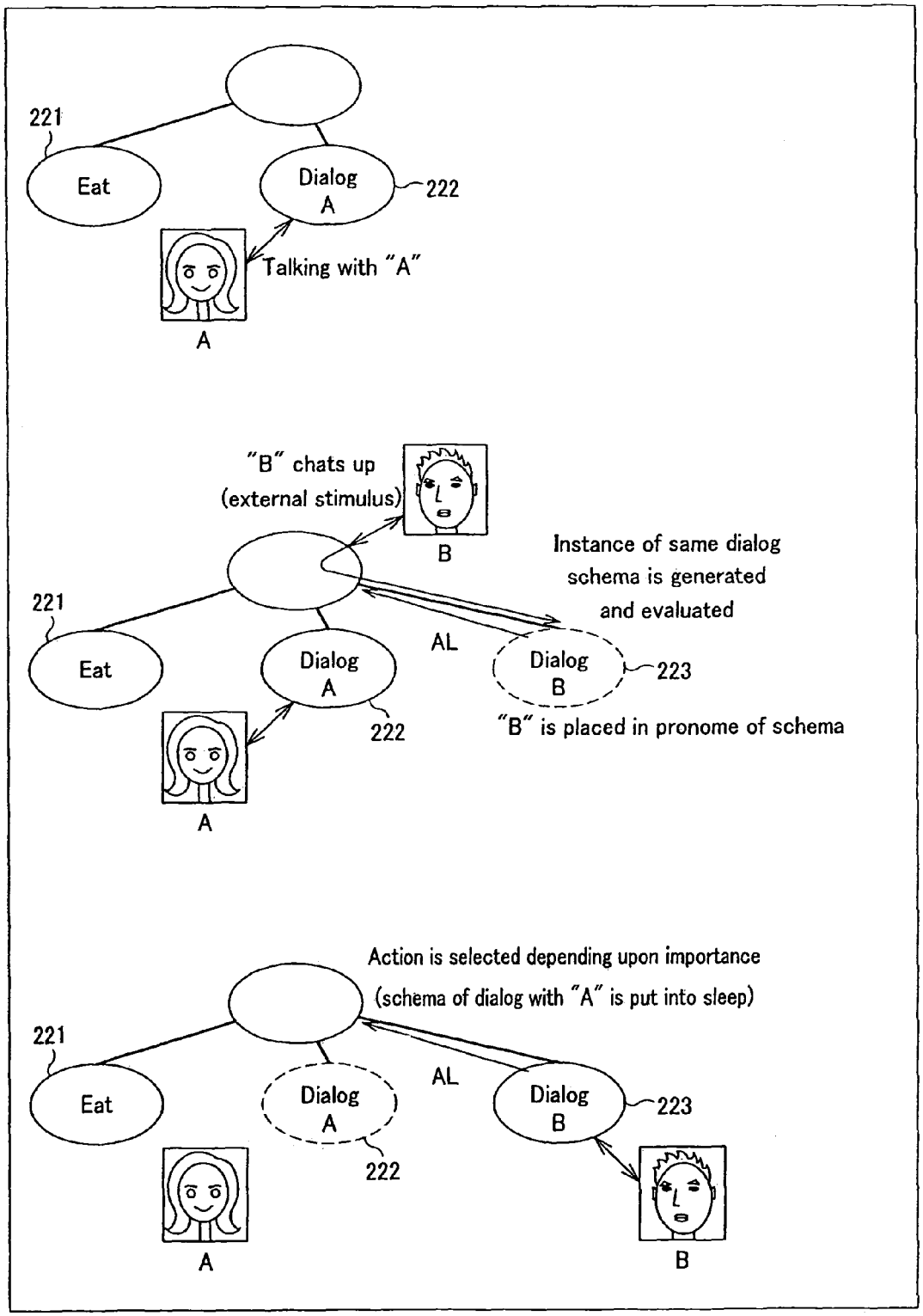
FIG. 28 explains the re-entrability of the schemata.

The schema re-entrability will be described in detail below with reference to FIG. 28. The Schema Handler 212 is a class object to manage the schemata. It saves, as a file, information on the configuration of the schemata included in the SBL 102. At start of the system, the Schema Handler 212 reads the configuration information file to reconstruct the tree configuration of schemata in the SBL 102. In the example shown in FIG. 28, the entities of the schemata specifying the actions such as "Eat" 221, "Dialog" 222, etc. are mapped in the memory space.

Here it is assumed that as the result of evaluation of the activation level AL, made based on the external stimulus 183 and internal-state variation 184, a target "A" (Pronome) is set for the schema "Dialog" 222 and the "Dialog" 222 is to have a conversation with the person A.

It is also assumed that in this situation, a person B has broken in the conversation between the robot device 1 and person A and then a higher priority has been given to the schema 223 having conversation with the person B as the result of evaluation of the activation level AL, made based on the external stimulus 183 and internal-state variation 184.

In such a case, the Schema Handler 212 will map another Dialog entity (instance) having inherited a class which has conversation with the person B in the memory space. Since the conversion with the person B is made using the other Dialog entity and independently of the initial Dialog entity, the conversation with the person A will not be broken. Therefore, the Dialog A can maintain the data consistency. After completion of the conversation with the person B, the conversation with the person A can be resumed starting at the break point.

The schema in the Ready list is evaluated correspondingly to its object (external stimulus 183), namely, the activation level AL of the schema is calculated, and the right of performance is passed to the schema. Thereafter, the instance of a schema having been shifted into the Ready list is generated, and other object is evaluated. Thus, the same schema can be put into the active or sleep state.

The control program implementing the aforementioned control system is pre-stored in the flash ROM 23 as mentioned above, and read during the initial period after the power is connected to the robot device 1. Thus, the robot device 1 can autonomously act in response to its own internal state, surroundings, instruction from the user or user's action onto the robot device 1.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the robot device 1 which autonomously select an action in response to its own internal state and external stimulus and implement the selected action includes the plurality of action-stating modules having actions stated therein, activation level calculating means for calculating the activation level of each action stated in the plurality of action-stating modules on the basis of the internal state and external stimulus, and the action selecting means for selecting the action-stating module on the basis of the calculated activation level and implementing the action stated in the action-stating module. The action stated in each action-stating module is associated with a predetermined internal state and external stimulus. The activation level calculating means determines an instinct for an action associated with a satisfaction level based on the internal state and the internal state, and calculates the activation level of each action on the basis of a predicted satisfaction-level variation determined from an instinct level obtainable from the current internal state and a predicted internal state which is predicted to vary based on the current internal state and supplied external stimulus. So, since different actions are selected in response to the same external stimulus and internal state by determining the level of an instinct for an action to be implemented from the internal state and determining a variation predicted after implementation of the action on the basis of the satisfaction level based on the current internal state, calculating an activation level from these data and selecting an action, the robot device can implement an unwearing action to various users in response to the internal state which varies in response to the environments and communication with the user.

The invention claimed is:

1. A robot device which autonomously selects and implements an action on the basis of its own internal state and an external stimulus, the robot device comprising:
  a plurality of action-stating modules each having an action stated therein;
  an activation level calculating means for calculating the activation level of each of the actions stated in the plurality of action-stating modules from the internal state and external stimulus; and
  an action selecting means for selecting one of the action-stating modules on the basis of the calculated activation level and performing the action stated in the selected action-stating module,
  wherein the action stated in each of the action-stating modules are associated with a predetermined internal state and predetermined external stimulus;
  wherein the activation level calculating means determines (a) an instinct level for an action associated with a current internal state, (b) a satisfaction level based on the current internal state, (c) a predicted internal state based on current external stimuli, the predicted internal state indicating a possible internal state as a result of implementing an action, (d) a predicted satisfaction level variation based upon the predicted internal state and (e) releasing state based upon the satisfaction level and the predicted satisfaction level variation,
  wherein the activation level is calculated for each action on the basis of the instinct level and the releasing state.

2. The device according to claim 1, wherein the activation level calculating means calculates the activation level of each action from the instinct level determined from the current internal state, satisfaction level determined from the current internal state and the predicted satisfaction level variation.

3. The device according to claim 1, wherein the activation level calculating means has an activation level calculation data base in which input external stimulus and predicted internal-state variation calculates the activation level with reference to the activation level calculation data base.

4. The device according to claim 3, wherein the activation level calculation data base has the predicted internal-state variation associated with the value of the external stimulus.

5. The device according to claim 4, wherein in case a value not in the activation level calculation data base is supplied, the activation level calculating means calculates a predicted internal-state variation by the linear interpolation using a linear model.

6. A robot action controlling method for use in a robot device to control the robot device to autonomously select and implement an action on the basis of its own internal state and an external stimulus, the method comprising:
  an activation level calculating step of calculating the activation level of each of the actions stated in a plurality of action-stating modules from the internal state and external stimulus; and
  an action selecting step of selecting one of the action-stating modules on the basis of the calculated activation level and performing the action stated in the selected action-stating module, the action stated in each of the action-stating modules being associated with a predetermined internal state and external stimulus; and
  in the activation level calculating step, determining (a) an instinct level for an action associated with a current internal state, (b) a satisfaction level based on the current internal state, (c) a predicted internal state base on current external stimuli, the predicted internal state indicating possible internal state as a result of implementing action, (d) a predicted satisfaction level variation based upon the predicted internal state and (e) releasing state based upon the satisfaction level and the predicted satisfaction level variation, and wherein the activation level for each action being calculated from the instinct level and the releasing state.

7. The method according to claim 6, wherein in the activation level calculating step, the activation level of each action is calculated from the instinct level determined from the current internal state, satisfaction level determined from the current internal state and the predicted satisfaction level variation.

8. The method according to claim 6, wherein in the activation level calculating step, the activation level is calculated with reference to an activation level calculation data base in which input external stimulus and predicted internal-state variation are associated with each other.

9. The method according to claim 8, wherein the activation level calculation data base has the predicted internal-state variation associated with the value of the external stimulus.

10. The method according to claim 9, wherein in case a value not in the activation level calculation data base is supplied, a predicted internal-state variation is calculated by the linear interpolation using a linear model in the activation level calculating step.

11. A non-transitory computer-readable medium storing a program to have a computer control a robot device to autonomously select and implement an action on the basis of its own internal state and an external stimulus, the program comprising:

an activation level calculating step of calculating the activation level of each of the actions stated in a plurality of action-stating modules from the internal state and external stimulus; and an action selecting step of selecting one of the action-stating modules on the basis of the calculated activation level and performing the action stated in the selected action-stating module, the action stated in each of the action-stating modules being associated with a predetermined internal state and external stimulus; and in the activation level calculating step, determining (a) an instinct level for an action associated with a current internal state, (b) a satisfaction level based on the current internal state,(c) a predicted internal state based on current external stimuli the predicted internal state indicating possible internal state as a result of implementing an action, (d) a predicted satisfaction level variation based upon the predicted internal state and (e) releasing state based upon the satisfaction level and the predicted satisfaction level variation, and wherein the activation level for each action being calculated from the instinct level and the releasing state.

* * * * *